United States Patent [19]
Nakamura et al.

[11] Patent Number: 5,633,289
[45] Date of Patent: May 27, 1997

[54] PROCESS FOR MOLDING AN INTEGRAL SKIN FOAM AND A POLYURETHANE MATERIAL FOR MOLDING THE SAME

[75] Inventors: Michihiko Nakamura; Masanao Ishikake; Yukio Kawakita; Akira Mabuchi; Osamu Yamanaka, all of Aichi-ken, Japan

[73] Assignee: Toyoda Gosei Co., Ltd., Nishikasugai, Japan

[21] Appl. No.: 213,014

[22] Filed: Mar. 14, 1994

[30] Foreign Application Priority Data

Mar. 16, 1993 [JP] Japan ................................. 5-082660
Mar. 16, 1993 [JP] Japan ................................. 5-082661

[51] Int. Cl.⁶ .................................................. C08J 9/34
[52] U.S. Cl. ........................... 521/51; 521/159; 521/170; 521/174; 521/176; 528/48; 264/51
[58] Field of Search ............................ 521/51, 159, 170, 521/174, 176; 264/51; 528/48

[56] References Cited

U.S. PATENT DOCUMENTS

| | | |
|---|---|---|
| 3,824,199 | 7/1974 | Nadeau et al. . |
| 3,954,537 | 5/1976 | Alfter et al. . |
| 3,970,732 | 7/1976 | Slaats et al. . |
| 4,042,540 | 8/1977 | Lammerting et al. . |

(List continued on next page.)

FOREIGN PATENT DOCUMENTS

| | | |
|---|---|---|
| 0006381 | 1/1980 | European Pat. Off. . |
| 0044226 | 1/1982 | European Pat. Off. . |
| 0211495 | 2/1987 | European Pat. Off. . |
| 0353061 | 1/1990 | European Pat. Off. . |

(List continued on next page.)

OTHER PUBLICATIONS

Patent Abstracts of Japan, vol. 5, No. 190 (M–100) (1981).
Patent Abstracts of Japan, vol. 8, No. 057 (M–283) (1984).
Patent Abstracts of Japan, vol. 4, No. 105 (M–023) (1980).
Patent Abstracts of Japan, vol. 88, No. 1007 (M–750) (1988).

*Primary Examiner*—Nathan M. Nutter
*Assistant Examiner*—Duc Truong
*Attorney, Agent, or Firm*—Cushman Darby & Cushman Intellectual Property Group of Pillsbury Madison & Sutro, LLP

[57] ABSTRACT

A process and a polyurethane material for molding a semi-rigid integral skin foam which comprising an integral skin having a low degree of foaming and a core having a high degree of foaming. The process includes evacuating a mold cavity to reduce the pressure thereof below atmospheric pressure; injecting into the evacuated mold cavity a polyurethane material; and foaming the material to fill the cavity. The polyurethane material contains a polyol component and an isocyanate component with, at most, 5 parts by weight of a solvent for 100 parts by weight of the polyol component, in the absence of freon.

11 Claims, 17 Drawing Sheets

U.S. PATENT DOCUMENTS

| | | |
|---|---|---|
| 4,206,170 | 6/1980 | Sassaman et al. . |
| 4,285,893 | 8/1981 | Contastin . |
| 4,347,330 | 8/1982 | Demou et al. . |
| 4,379,105 | 4/1983 | Taylor et al. . |
| 4,510,106 | 4/1985 | Hirsch . |
| 4,517,313 | 5/1985 | Nakatani . |
| 4,555,087 | 11/1985 | Wallner et al. . |
| 4,572,865 | 2/1986 | Gluck et al. . |
| 4,576,970 | 3/1986 | Ganster et al. . |
| 4,579,700 | 4/1986 | Cavender . |
| 4,909,972 | 3/1990 | Britz . |
| 4,916,168 | 4/1990 | Pham et al. . |
| 4,988,271 | 1/1991 | Kumasaka et al. . |
| 5,100,926 | 3/1992 | Kondo et al. . |
| 5,116,183 | 5/1992 | Lee . |
| 5,132,329 | 7/1992 | Lynch et al. . |
| 5,166,183 | 11/1992 | Franyutti et al. . |

FOREIGN PATENT DOCUMENTS

| | | |
|---|---|---|
| 451559 | 10/1991 | European Pat. Off. . |
| 0451559 | 10/1991 | European Pat. Off. . |
| 0461522 | 12/1991 | European Pat. Off. . |
| 0534358 | 3/1993 | European Pat. Off. . |
| 1575243 | 7/1969 | France . |
| 2634157 | 1/1990 | France . |
| 2318794 | 4/1973 | Germany . |
| 2212609 | 10/1973 | Germany . |
| 1813298 | 6/1979 | Germany . |
| 2366184 | 6/1979 | Germany . |
| 3310677 | 3/1983 | Germany . |
| 4115456 | 11/1992 | Germany . |
| 55-63237 | 5/1980 | Japan . |
| 55-63238 | 5/1980 | Japan . |
| 56-111648 | 9/1981 | Japan . |
| 62-164709 | 7/1987 | Japan . |
| 63-268624 | 11/1988 | Japan . |
| 64-5528 | 1/1989 | Japan . |
| 1407244 | 9/1975 | United Kingdom . |
| 2092509 | 8/1982 | United Kingdom . |

PROCESS FOR MOLDING AN INTEGRAL SKIN FOAM AND A POLYURETHANE MATERIAL FOR MOLDING THE SAME

BACKGROUND OF THE INVENTION

The present invention is further detailed in Japanese Patent Application Nos. 5-82660 and 5-82661, both filed Mar. 16, 1993, for which the present application claims priority and the entire contents of which are incorporated herein by reference.

1. Field of the Invention

The present invention provides a process for molding a semi-rigid integral skin foam, wherein the semi-rigid integral skin foam comprises an integral skin region having a low degree of foaming and a core region having a high degree of foaming. The present invention further provides a polyurethane material for molding such a foam, which is suitable for reaction injection molding (RIM) of a molded product having an integral skin foam, such as a cover or pad for a steering wheel of a motor vehicle, an instrument panel, a console box lid, a glove box lid, a headrest, an armrest, or an air spoiler.

2. Description of Related Art

A semi-rigid polyurethane foam containing an integral skin region having a low degree of foaming on its surface and a core region having a high degree of foaming at its center is generally referred to as an integral skin foam (ISF). An ISF is produced from a long-chain polyol having a molecular weight of the order of thousands, such as 1,000–9,000, a low-molecular polyol having a molecular weight of the order of tens to hundreds such as 10–900, a catalyst, a pigment, freon as a foaming agent, and an isocyanate component. In normal operations, all the components, except the isocyanate component, are preliminarily mixed to give a polyol mixture. The polyol mixture is mixed with the isocyanate component by a mixing head in a prescribed ratio to give a polyurethane material. Finally, the polyurethane material is injected into a mold cavity made of a highly heat-conductive material, so that it expands in the mold cavity. The freons which are normally employed include CFC-11 (trichloromonofluoromethane) and HCFC-123 (2,2-dichloro-1,1,1-trifluoroethane). For example, about 16 parts by weight of HCFC-123 are used with 100 parts by weight of the polyol component for molding an ISF cover for a steering wheel.

Upon injection into the mold cavity, the polyol mixture and the isocyanate component undergo a urethane-forming reaction, which is exothermic enough to vaporize freon in the polyurethane material into a myriad of bubbles. The polyurethane material slowly expands and flows in the mold cavity, expelling air from a vent hole of the mold cavity.

At the center of the polyurethane material, the urethane-forming reaction and the vaporization of freon take place simultaneously, sustaining a myriad of freon bubbles. This results in the formation of a core having a high degree of foaming. The polyurethane material close to the wall surface of the mold cavity undergoes the urethane-forming reaction more slowly than that at the center, because the reaction heat dissipates through the wall of the mold cavity. One skilled in the art will appreciate that the slower reaction is characterized by a lower reaction heat and, consequently, a reduced number of bubbles will be formed from a decreased vaporization of freon. The bubbles are compressed or collapsed by the internal foaming pressure. The result is the formation of an integral skin having a low degree of foaming.

The above-described conventional method for producing an ISF by the aid of freon poses the following problems: freon release to the atmosphere from any industrial or commercial process is recognized as a global problem and reductions in its use are being mandated by many countries; formation of the integral skin by collapsing bubbles at the surface section by the internal foaming pressure allows minute bubbles to inevitably remain in the skin which ultimately impair the appearance of the final foamed product; and overpacking and subsequent discharge of the polyurethane material from a vent is necessary to increase the internal foaming pressure and to promote the mold filling. Ultimately this leads to a great loss of material.

An effective way of increasing the production efficiency of producing urethane foam articles is to increase the reaction rate of the polyurethane material, thereby reducing the cure time. This object can be achieved by increasing the amount of the catalyst or raising the temperature of the polyurethane material before injection. The latter is preferable to the former, which leads to an increase in production cost. It has, however, been actually impossible to adopt the latter method when freon is used as a foaming agent, since its vaporization or a rise in tank pressure is likely to occur immediately after the injection of the polyurethane material. Moreover, the use of freon in a large amount can delay the curing of the product of the urethane-forming reaction and thereby prolong the cure time, as the heat of the urethane-forming reaction is dissipated due to vaporization of the freon. By eliminating freon in the urethane-forming reaction, the present invention provides greater alternatives in this regard.

Further, freon foamed processes which include a core in the mold cavity, such as is common in the production of steering wheels, suffer from turbulence induced defects such as pinholes, voids and short shot, due to entrapped air. This is particularly a problem in the production of steering wheels, in which case a long ring core is placed in the mold cavity. Thus, it is necessary to select an adequate place for gating to minimize turbulence and to form several vents to release entrapped air.

Alternative methods for producing polyurethane foams using reduced pressure are disclosed in the following Japanese Patents, however, these patents do not necessarily disclose or suggest the object, constitution and effect of the present invention.

Japanese Patent Laid-open Nos. 55-63237 and 55-63238 disclose a method for causing a polyurethane material to uniformly expand to fill a mold cavity completely, by evacuating the mold cavity through thin grooves formed in the walls of the mold cavity. However, these patents presumably teach the use of standard foaming agents as only conventional compositions are disclosed.

Japanese Patent Laid-open No. 56-111648 discloses a method for foaming a polyurethane material in an atmosphere of reduced pressure. The patentee claims that this method provides for a reduction in the amount of foaming agent, such as freon, required. However, this method employs freon as conventionally used. This patent does not provide for the advantageous elimination of freon, as in the present invention.

Japanese Patent Laid-open No. 62-164709 discloses a method for producing a low-density polyurethane foam by expanding a polyurethane material which contains water as a foaming agent in an atmosphere of reduced pressure. Unlike the present invention, this method is not intended to produce an ISF. The formation of the skin is not desirable. Japanese Patent Laid-open No. 63-268624 discloses a method for producing a polyurethane foam by causing a polyurethane material to capture nitrogen gas as much as 2–30 vol %, and expanding the polyurethane material in an atmosphere under reduced pressure. This method is not taught to be useful to produce an ISF.

Japanese Patent Publication No. 64-5528 discloses a method for producing a polyurethane foam by injecting a rigid polyurethane material into an evacuated mold cavity at a packing ratio of about 150–450%, and subsequently expanding the polyurethane material, however, the polyurethane material contains a foaming agent, such as freon.

SUMMARY OF THE INVENTION

It is a first object of the present invention to provide a method for molding an ISF in the substantial absence, preferably in the complete absence of freon and thereby provide a more ecologically advantageous process aimed at meeting more stringent regulatory standards.

It is another object to provide a method for the formation of a solid integral skin with a low degree of foaming whereby virtually no bubbles remain, which provides a product with a surface appearance and feel which are superior to those of a product made using conventional processes where freon is included as a foaming agent.

It is a further object of the present invention, to provide a method for forming an integral skin and a core which are of uniform quality and free from any defect such as uneven cells or defective cavities.

It is yet another object of the present invention, to provide a method of forming an ISF wherein it is possible to control the time for restricting an initial increase in viscosity of a urethane molding material and thereby alter its fluidity in accordance with the shape of the product to be molded.

The method of the present invention further achieves a cure time which is shorter than what is required when freon is used as a foaming agent, and thereby a higher molding efficiency. Further, the method of the instantly disclosed invention provides for easier production control of skin thickness and hardness of the ISF produced. One skilled in the art will appreciate that the method of the present invention provides a product with reduced defects such as pinholes, voids and short shot, thereby eliminating the common practice of overpacking polyurethane material which had previously led to an increased loss of material. The present invention allows the manufacture of an ISF having a high degree of elongation, while not having any substantially lower tensile strength.

It is another object of the present invention to provide a material which can be foamed in the process herein disclosed.

The present invention, therefore, provides an improved process for molding a semi-rigid integral skin foam which contains an integral skin having a low degree of foaming and a core having a high degree of foaming. The improved process of the present invention includes foaming, in an evacuated mold cavity, a polyurethane material of a polyol component and an isocyanate component, in the absence of any freon, and containing not more than 5 parts by weight of a solvent for 100 parts by weight of the polyol component.

The present invention also provides an improved polyurethane material, which is foamed in an evacuated mold cavity, wherein a semi-rigid integral skin foam which comprises an integral skin having a low degree of foaming and a core having a high degree of foaming are produced. The improved material contains a polyol component and an isocyanate component, in the absence of freon, and contains not more than 5 parts by weight of a solvent for 100 parts by weight of the polyol component.

The solvent can, for example, be of the type not reacting with the isocyanate component. Such a solvent may be selected from the group consisting of hydrocarbons, halogenated ethers, acetals, ketones, esters, fatty acids, phenals, and nitrogen, sulfur and phosphorous containing compounds, as well as inorganic solvents such as are known in the art. More specifically, the solvent may be selected from the group consisting of:

propane, n-butane, n-pentane, n-hexane, n-heptane, n-octane, isooctane, n-decane, 2,2-dimethylbutane, petroleum ether, petroleum benzine, ligroin, gasoline, kerosine, petroleum spirit, petroleum naphtha, ethylene, 2-pentene, cyclohexane, methylcyclohexane, benzene, toluene, xylene, ethylbenzene, diethylbenzene, isopropylbenzene, amylbenzene, diamylbenzene, triamylbenzene, tetraamylbenzene, dodecylbenzene, didodecylbenzene, amyltoluene, coal tar naphtha, solvent naphtha, p-cymene, naphthalene, tetralin, decalin, biphenyl, dipentene, turpentine oil, pinene, p-menthane, pine oil camphor oil;

methyl chloride, methylene chloride, chloroform, carbon tetrachloride, ethyl chloride, ethylene chloride, ethylidene chloride, 1,1,1-trichloroethane, 1,1,2-trichloroethane, 1,1,1,2-tetrachloroethane, 1,1,2,2-tetrachloroethane, pentachloroethane, hexachloroethane, vinylidene chloride, 1,2-dichloroethylene, trichloroethylene, 1,2,3-trichloropropane, isopropyl chloride, allyl chloride, 1,2-dichloropropane, butyl chloride, amyl chloride, dichloropentane, hexyl chloride, 2-ethylhexyl chloride, methyl bromide, ethyl bromide, ethylene bromide, tetrabromoethane, chlorobromomethane, ethylene chlorobromide, chlorobenzene, o-dichlorobenzene, 1,2,4-trichlorobenzene, bromobenzene, o-dibromobenzene, o-chlorotoluene, p-chlorotoluene, α-chloronaphthalene and chlorinated naphthalene;

ethyl ether, dichloroethyl ether, isopropyl ether, n-butyl ether, diisoamyl ether, n-hexyl ether, methyl phenyl ether, ethyl phenyl ether, n-butyl phenyl ether, amyl phenyl ether, o,m,p-cresyl methyl ether, p-tertiary amyl phenyl-n-amyl ether, ethyl benzyl ether, 1,2-propylene oxide, epichlorohydrin, diglycidyl ether, 1,4-dioxane, trioxane, furan, furfural, 2-methylfuran, tetrahydrofuran, tetrahydropyran, cineole, methylal and diethyl acetal;

acetone, methyl acetone, methyl ethyl ketone, methyl n-propyl ketone, methyl n-butyl ketone, methyl isobutyl ketone, methyl n-amyl ketone, methyl n-hexyl ketone, diethyl ketone, ethyl n-butyl ketone, di-n-propyl ketone, diisobutyl ketone, 2,6,8-trimethylnonane-4, acetone oil, acetonylacetone, diacetone alcohol, mesityl oxide, phorone, isophorone, cyclohexanone, methylcyclohexanone, acetophenone and camphor;

methyl formate, ethyl formate, propyl formate, n-butyl formate, isobutyl formate, amyl formate, methyl acetate, ethyl acetate, n-propyl acetate, isopropyl acetate, n-butyl acetate, isobutyl acetate, sec-butyl acetate, n-amyl acetate, isoamyl acetate, methylisoamyl acetate, methoxybutyl acetate, sec-hexyl acetate, 2-ethylbutyl acetate, methylisobutylcarbinol acetate, 2-ethylhexyl acetate, cyclohexyl acetate, methylcyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl hydroxyisobutyrate, butyl stearate, amyl stearate, ethyl acetoacetate, isoamyl isovalerate, methyl lactate, ethyl lactate, n-butyl or isobutyl lactate, n-amyl or isoamyl lactate, methyl benzoate, ethyl benzoate, propyl benzoate, butyl benzoate, isoamyl benzoate, benzyl benzoate, ethyl cinnamate, ethyl abietate, benzyl abietate, dioctyl adipate, diethyl oxalate, dibutyl oxalate, diamyl oxalate, diethyl malonate, dibutyl tartrate, tributyl citrate, dioctyl sebacate, dimethyl phthalate, diethyl phthalate, dibutyl phthalate, di-2-ethylhexyl phthalate and dioctyl phthalate; formic acid, acetic acid, acetic anhydride, propionic acid, propionic anhydride, butyric acid, butyric anhydride, isobutyric acid, valeric acid, isovaleric acid, trimethylacetic acid, caproic acid, 2-ethylacetic acid, caprylic acid, 2-ethylhexanoic acid, oleic acid, monochloroacetic acid, dichloroacetic acid, trichloroacetic acid, lactic acid, phenol, cresol, o-cresol, m-cresol, p-cresol and xylenol;

nitromethane, nitroethane, 1-nitropropane, 2-nitropropane, nitrobenzene, o-nitroanisole, monomethylamine, dimethylamine, trimethylamine, monoethylamine, diethylamine, triethylamine, isopropylamine, diisopropylamine, n-butylamine, n-dibutylamine, n-tributylamine, isobutylamine, diisobutylamine, sec-butylamine, n-amylamine, diaminoamine, triallylamine, sec-amylamine, sec-hexylamine, 2-ethylbutylamine, n-heptylamine, 2-ethylhexylamine, dioctylamine, ethylenediamine, propylenediamine, diethylenetriamine, tetraethylenepentamine, aniline, monomethylaniline, dimethylaniline, diethylaniline, N-mono-n-butylaniline, N,N-di-n-butylaniline, N-monoamylaniline, p-tert-amylaniline, N,N-diamylaniline, N,N-di-tert-amylaniline, o-toluidine, o-chloroaniline, cyclohexylamine, dicyclohexylamine, diethylbenzylamine, monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, triisopropanolamine, isopropanolamine (mixture), formamide, N,N-dimethylformamide, acetoanilide, acetonitrile, benzonitrile, acetone cyanhydrin, pyridine, α-picoline, β-picoline, γ-picoline, 2,4-lutidine, 2,6-lutidine, quinoline, isoquinoline, morpholine, ethylmorpholine and phenylmorpholine;

carbon disulfide, dimethyl sulfoxide, propanesultone, triethyl phosphate, tri-n-butyl phosphate, triphenyl phosphate, tricresyl phosphate, diethyl carbonate (ethyl carbonate), ethylene carbonate and amyl borate;

liquid ammonia, liquid sulfurous acid, sulfuric acid, cuprammonium solution, nitric acid and silicone oil.

Monohydric alcohol (which reacts with the isocyanate component) can also be used as the solvent for the polyurethane material. It is possible to use either one kind of monohydric alcohol or a mixture of two or more monohydric alcohols. Examples of the alcohols which can be used are: methanol, ethanol, n-propanol, isopropanol, n-butanol, isobutanol, secondary butanol, tertiary butanol, n-amyl alcohol, isoamyl alcohol, secondary amyl alcohol, 3-pentanol, tertiary amyl alcohol, fusel oil, n-hexanol, methylamyl alcohol, 2-ethylbutanol, n-heptanol, 2-heptanol, 3-heptanol, n-octanol, 2-octanol, 2-ethylhexanol, 3,5,5-trimethyl-hexanol, nonanol, n-decanol, undecanol, n-dodecanol, trimethylnonyl alcohol, tetradecanol, heptadecanol, cyclohexanol, 2-methylcyclohexanol, benzyl alcohol, glycidol, furfuryl alcohol, tetrahydrofurfuryl alcohol, α-terpineol and abietyl alcohol.

The amount of the solvent to be added depends on its boiling point, the foaming rate which is required of an ISF to be molded, the thickness of its integral skin, and other factors known by one skilled in the art, however, the amount of solvent should not exceed 5 parts by weight.

The reduced pressure in the mold cavity (or its vacuum degree) also depends on the foaming rate, the thickness of the integral skin, and other factors which will be recognized and determinable by one skilled in the art, once given access to the instant disclosure and accordingly, the pressure is not limited to any particular value.

Although the polyurethane material contains no freon, it contains slight amounts of gases (mainly air) originally present therein and absorbed inevitably by it during its cycling. If the polyurethane material containing no freon is injected into the evacuated mold cavity, the resulting change of the pressure acting upon the material from a positive to a negative pressure causes foaming with the rapid vaporization of the gases, and eventually causes its defoaming with the rupture of bubbles.

The polyurethane material of the present invention produces a foam (having a high degree of foaming) during the bubbling of those gases, but its excessive defoaming results in a solid (having a low degree of foaming). The foaming and defoaming of the material are accompanied by the urethane-forming reaction, and the reaction heat promotes the curing of the polyurethane material. The process of the present invention which relies upon the difference in the degree of foaming or defoaming (negative pressure) from one portion of the material to another for molding an ISF, differs greatly from a process which relies upon the vaporization (positive pressure) of freon used as a foaming agent.

The polyurethane material of the present invention is foamed in a very short time under reduced pressure, such that it flows through the mold cavity and fills the cavity. The initially flowing portion of the polyurethane material adheres to the wall surface of the mold cavity, and the excessive debubbling of the gases absorbed in the material results in the formation of an integral skin having a low degree of foaming such that virtually no bubble remains therein. The skin has, therefore, a surface appearance and feel which are superior to those of a product made by employing freon as a foaming agent. The bubbles in the polyurethane material near the wall surface of the mold cavity are easily ruptured, since its curing is delayed by the dissipation of the reaction heat through the wall of the mold, and its increase in viscosity is restricted accordingly.

If the polyurethane material fills the mold cavity, the resulting rise of its pressure restricts the debubbling of the gases absorbed in the material. Then, the polyurethane material which is away from the wall surface of the mold cavity forms a highly foamed core which holds bubbles. The bubbles in the core are easily kept unruptured, since the reaction heat stored therein promotes the curing of the polyurethane material and thereby its rapid increase in viscosity.

For the formation of a good ISF, therefore, it is important to ensure the uniform promotion of the debubbling of gases in the material near the wall surface of the mold cavity in the beginning to form a solid and uniform integral skin and, subsequently, the uniform restriction of the debubbling in the material away from the wall surface to form a uniformly foamed core.

The mere use of the polyurethane material not containing any freon is, however, not sufficient for making a good ISF, since for a number of reasons as described below, the bubbles are difficult to control and defects, such as uneven cells and defective cavities, are likely to occur. In such a system, the gases absorbed in the material bubble more violently under reduced pressure than when freon is used as a foaming agent. Further, the polyurethane material has a high initial viscosity, as it is not diluted with freon. The polyurethane material undergoes rapid curing and a rapid initial increase in viscosity, due to the absence of reaction heat dissipation from freon vaporization.

The above problems can be overcome by addition of a small amount of a solvent to the polyurethane material. According to the present invention, the solvent is added to the polyurethane material in the amount of not more than 5 parts by weight for 100 parts by weight of a polyol component, so that the initial dissipation of the reaction heat to the solvent for its vaporization may bring about a restricted initial increase in viscosity of the polyurethane material and thereby a rise in its fluidity. The vaporization of the solvent is accompanied by the uniform bubbling and debubbling of the gases absorbed in the material, and thereby enables the formation of an integral skin and a core which are uniform and free from any of the above defects.

It has also been recognized by the applicants that it is possible to control the time for restricting the initial increase in viscosity of the polyurethane material and thereby alter its fluidity in accordance with the shape of the product to be molded, if the solvent or its amount is appropriately changed mainly by employing a different solvent having a different boiling point.

The foaming by the gases absorbed in the polyurethane material does not cause any dissipation of the heat of the urethane-forming reaction, since it does not depend on the reaction unlike when freon is used as a foaming agent, but takes place independently of the reaction.

A skin of variable thickness and hardness can be produced, as desired, by varying the degree of vacuum in the mold cavity. Since the mold cavity is evacuated, any defects, such as pinholes, voids and short shot, are less likely to occur. Therefore, it is possible to eliminate the necessity of overpacking the polyurethane material unlike when freon is used as a foaming agent. The loss of material is thereby reduced.

When a monohydric alcohol is used as the solvent, it combines with a part of the isocyanate component and thereby restricts the urethane-forming reaction, and the dissipation of the reaction heat to the monohydric alcohol for its initial vaporization enables a more effectively restricted initial increase in viscosity of the polyurethane material and a greater rise in its fluidity.

Moreover, the material containing a small amount of monohydric alcohol can make an ISF having a higher degree of elongation, while not having any substantially lower tensile strength, than what can be obtained from a material containing no such alcohol. Although it is generally true that the reaction between diethylene glycol in the polyol mixture and the isocyanate component can make a product of improved elongation, it is apparent that the monohydric alcohol enables a more greatly improved elongation by inhibiting any three-dimensional crosslinking reaction.

Further objects of this invention will become evident upon an understanding of the illustrative embodiments described below. Various advantages not specifically referred to herein but within the scope of the instant invention will occur to one skilled in the art upon practice of the instantly disclosed invention. The following examples and embodiments are illustrative and not seen to limit the scope of the invention.

DETAILED DESCRIPTION OF THE PREFERRED EMBODIMENTS

Figure 1:
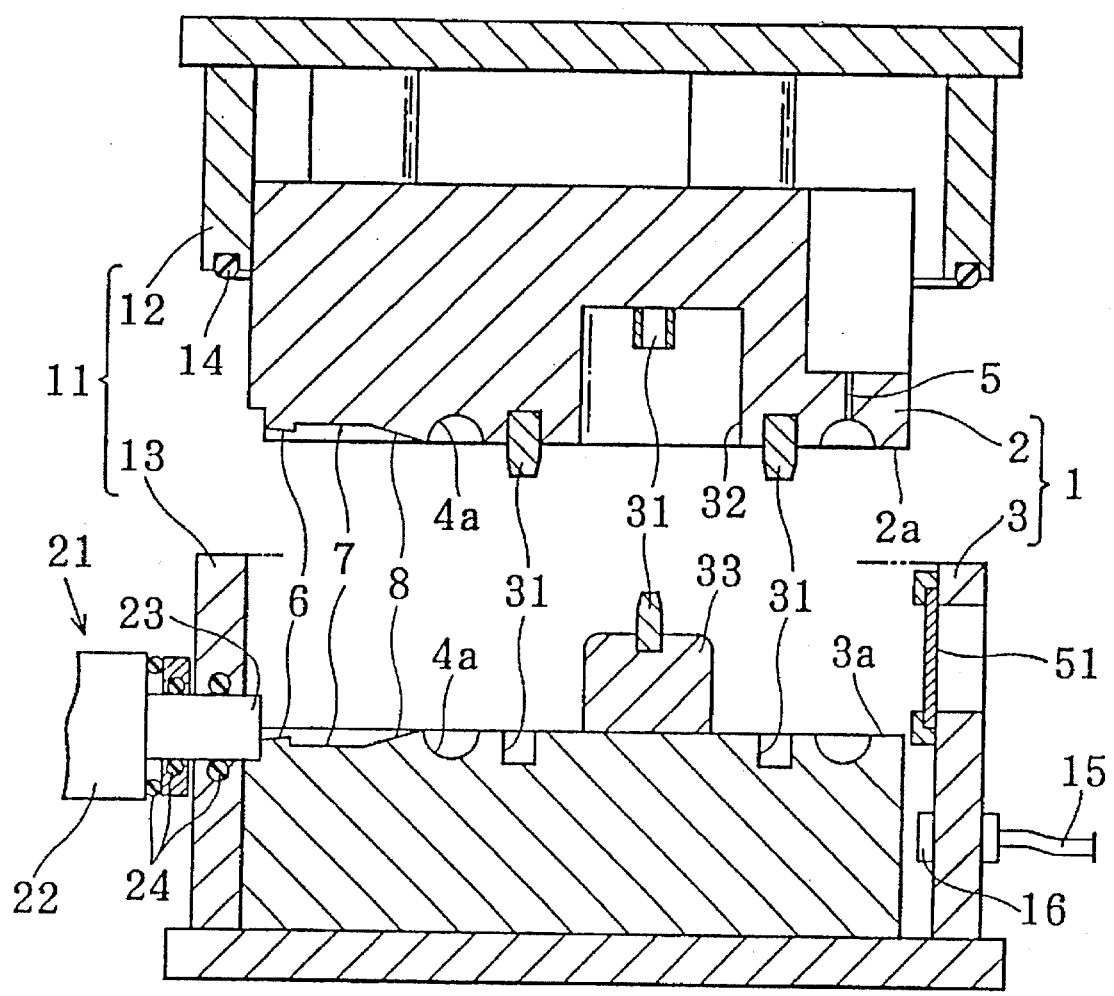
FIG. 1 is a sectional view showing a mold and vacuum chamber (in their open positions) used for RIM of an ISF cover for a steering wheel in accordance with the present invention.

A first embodiment of the present invention in the production of an ISF cover for a steering wheel will be described with reference to FIGS. 1 to 30. This embodiment employs an apparatus which is constructed of a mold (1) (composed of 2 split molds), a vacuum chamber (11) arranged in the mold (1), a vacuum pump (20) to evacuate the vacuum chamber (11), and an injection mechanism (21) which is attached to the vacuum chamber (11) and is intended to inject a polyurethane material into the cavity (4) of the mold (1). A core (42) of a steering wheel (41) used in this embodiment is composed of a ring, spokes, and a boss at the center of the core. An ISF cover (43) is formed around the entire ring and a part of the spokes.

The mold (1) is made up of an upper stationary half (2) and a lower movable half (3). The two halves have grooves (4a), which face each other and form a circular cavity (4) when the mold is closed. At the center of the cross-section of the cavity (4) is placed the core (42) (including the entire ring and a part of the spoke). The PL (parting line) surface (2a) of the stationary half (2) and the PL surface (3a) of the movable half (3) are recessed to form a sprue (6), runner (7) and gate (8) through which a polyurethane material is injected into the cavity (4). The gate (8) opens on the outer periphery of the groove (4a) (at the left side in FIG. 2). Upon injection into the cavity (4) through the gate (8), the polyurethane material M flows in two directions in the cavity (4) and the two flows meet at position L (at the right side in FIG. 2) where the filling of the cavity is completed.

A vent hole (5) is formed at the final filling position L in the stationary half (2). The vent hole (5) is usually 1–10 mm in diameter. With a diameter smaller than 1 mm, the vent hole (5) does not perform venting as desired, in case the final filling position L of the polyurethane material fluctuates. With a diameter larger than 10 mm, the vent hole (5) leaves a noticeable vent mark which makes the molded product look poor. The vent hole (5) in this embodiment is a straight one, 15 mm long and 3 mm in diameter. When the mold is closed, there will be a clearance of about 0.03–0.06 mm (due to the limit of machining precision) between the PL surfaces (2a) and (3a) over the entire periphery of the cavity (4). This clearance functions as an air vent land for venting, further described below.

Inside the grooves (4a) of the stationary half (2) and movable half (3) are mating parts (31) to align the two halves, a recess (32) and pedestal (33) to hold in position the boss of the core (42). The pedestal (33) is provided with an ejector pin (34) to release the steering wheel (41) as molded.

The mold (1) may be made of aluminum or electroformed for economy, according to known methods, provided that the mold will withstand a foaming pressure of approximately 50–500 kPa.

Figure 2:
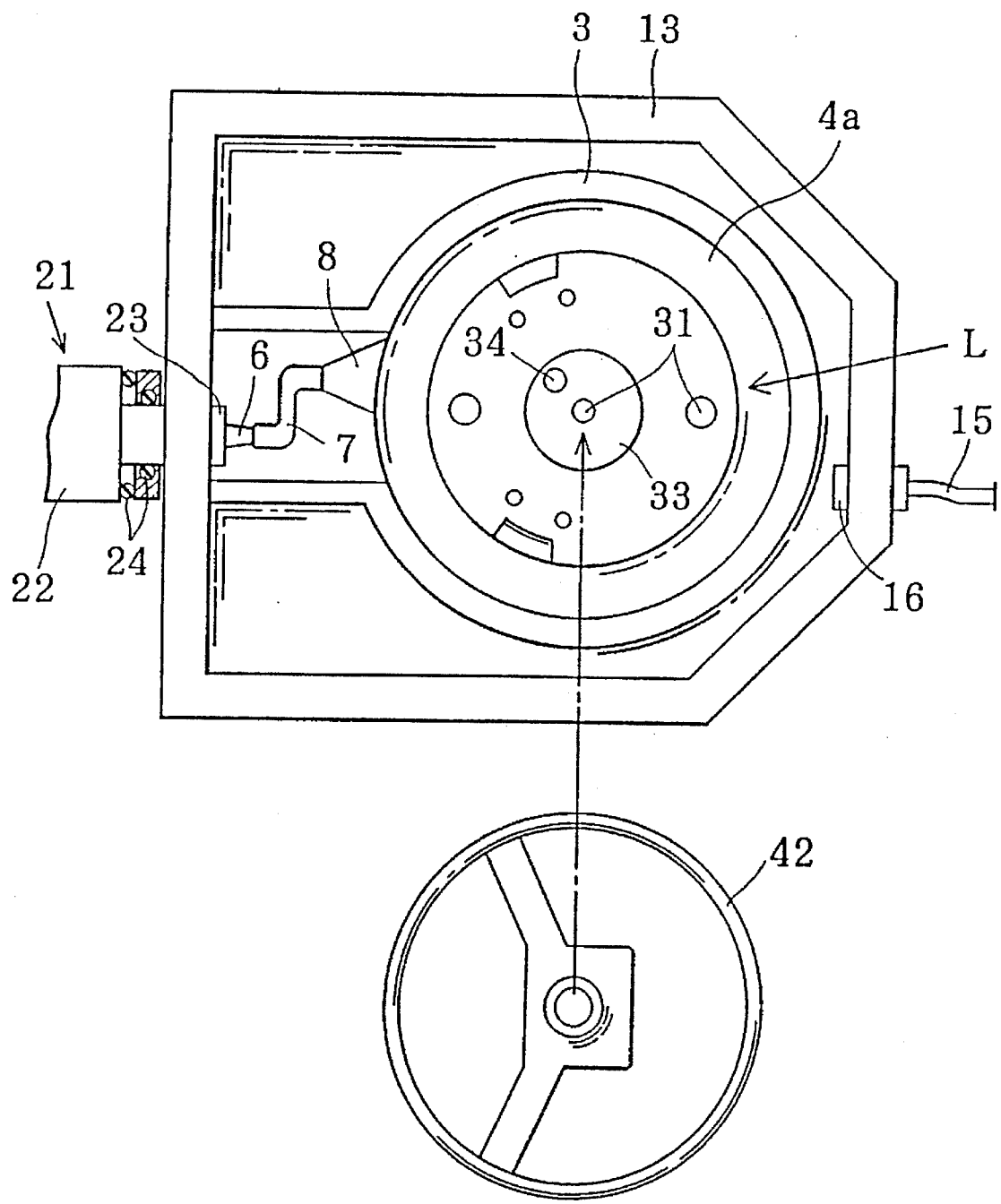
FIG. 2 is a top plan view showing a movable half of the mold and a lower casing of the vacuum chamber.
Figure 3:
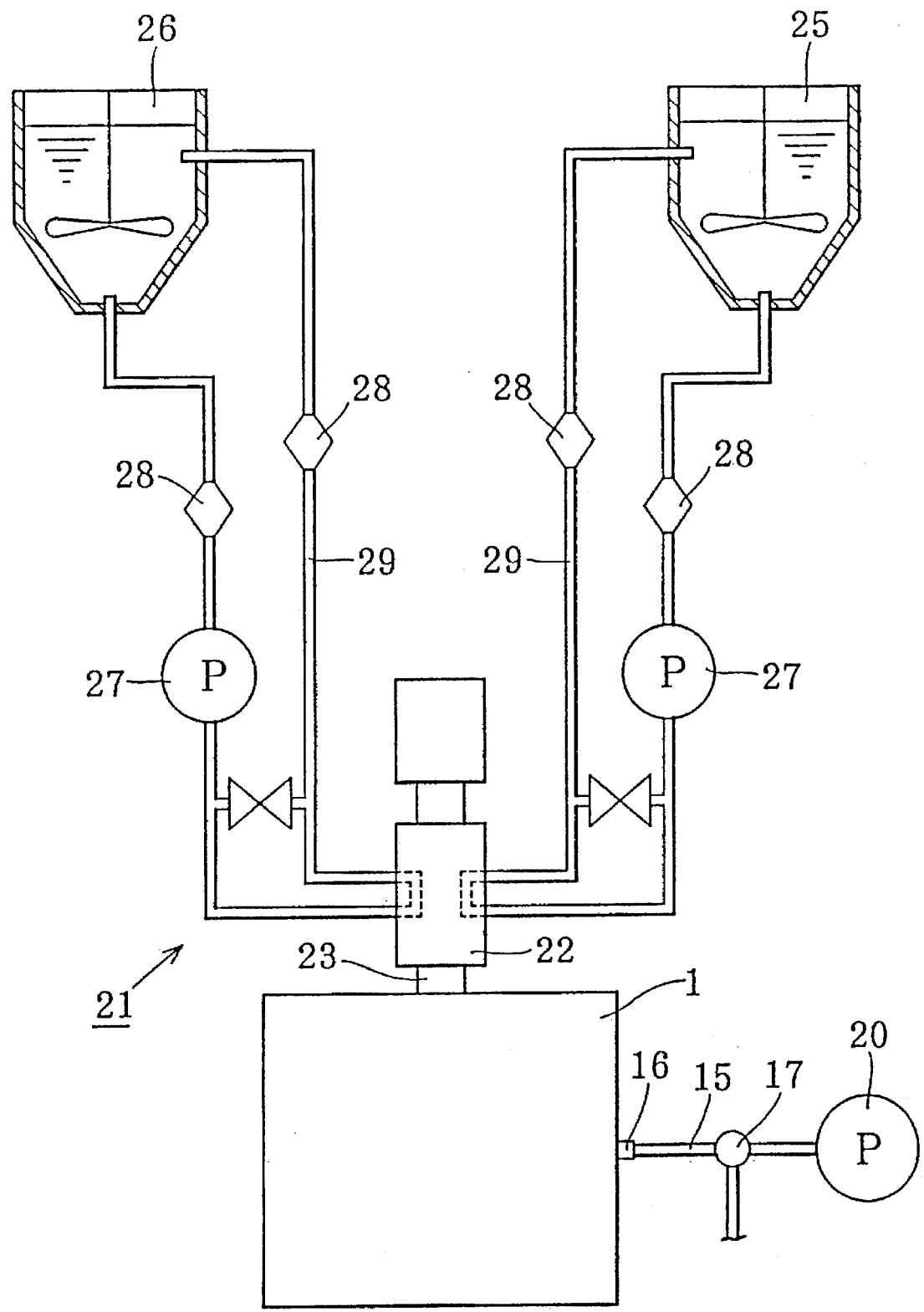
FIG. 3 is a schematic diagram showing an injection mechanism.

The vacuum chamber (11) is made up of an upper casing (12) to which the stationary half (2) is fixed and a lower casing (13) to which the movable half (3) is fixed. A mounting slot formed in the mating surface of the upper casing (12) is provided with a sealing O-ring (14), which makes the closed vacuum chamber (11) airtight. The lower casing (13) is provided with a suction port (16), which is connected to a vacuum pump (20) through a suction hose (15) and a leak valve (17), as shown in FIGS. 1 to 3. The vacuum chamber (11) is constructed such that it can accommodate the mold 1, forming a space K therein. The space K has a volume greater than the cavity (4).

Figure 5:
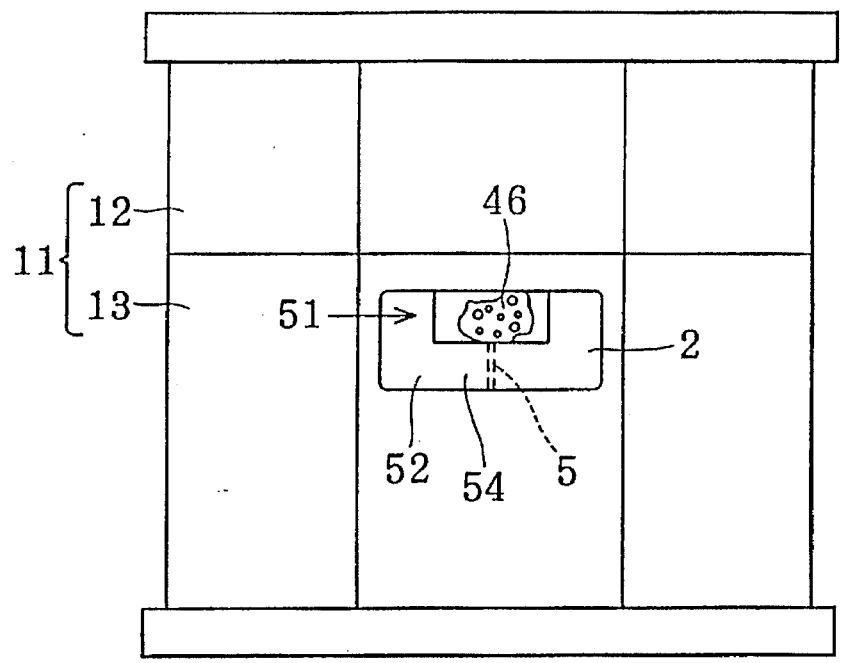
FIG. 5 is a side elevational view of FIG. 4 showing a sight glass.
Figure 6:
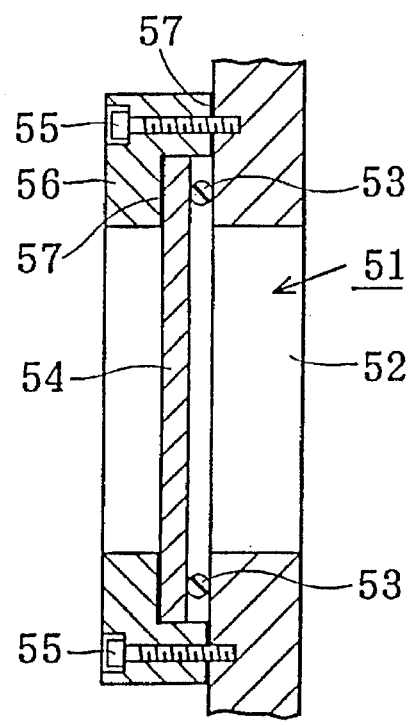
FIG. 6 is a partly enlarged sectional view of FIG. 4 showing the sight glass.

The lower casing (13) of the vacuum chamber (11) is provided with a sight glass (51) which makes the vicinity of the vent hole (5) visible from the outside of the lower casing (13), as shown in FIGS. 5 and 6. The sight glass (51) is made up of an opening (52) formed in the lower casing (13), a transparent plate (54) of glass or plastics which is pressed against the inside of the lower casing (13) with a seal ring (53) placed between them, so as to close the opening (52) from the inside, and a frame (56) which is fastened to the lower casing (13) by bolts (55) such that it presses the periphery of the transparent plate (54). It is desirable to place a gasket (57) between the frame (56) and the transparent plate (54), and between the frame (54) and the lower casing (13).

The stationary half (2) and the upper casing (12) are integrally constructed, and the movable half (3) and the lower casing (13) are also integrally constructed. The lower casing (13) is connected to a hydraulic cylinder ram (not shown), so that it is raised and lowered as the mold is closed and opened. At the time of mold closing, the lower casing (13) is raised until its periphery comes into contact with the periphery of the upper casing (12).

The injection mechanism (21), as shown in FIG. 3, is made up of a storage tank (25) for a polyol mixture, a storage tank (26) for an isocyanate component, a mixing head (22), and two circuits (29), each connecting the storage tank and the head through a high-pressure pump (27) and filters (28). This construction permits the mixing and circulation of the polyol mixture and the isocyanate component. The mixing head (22), as shown in FIG. 1, is provided with an injection nozzle (23) which can be connected to the sprue (6) of the mold (1) through O-rings (24).

A polyurethane material used in this embodiment consists essentially of a polyol component and an isocyanate component, does not contain any freon, and contains not more than 5 parts by weight of a solvent (the type not reacting with the isocyanate component, or a monohydric alcohol) for 100 parts by weight of the polyol component. The temperature of the polyurethane material is preferably higher than that of the conventional freon-containing polyurethane material. To be more specific, during processing, the polyol mixture (composed of a polyol component and other components) is preferably kept at about 40°–50° C. and the isocyanate component is kept at about 25°–30° C. in this embodiment, whereas the polyol mixture and the isocyanate component are both kept at about 25°–30° C. in the conventional freon-based foaming. The potentially disadvantageous increased viscosity of a freon-free polyurethane material, as compared with the conventional freon-containing composition, is eliminated by raising the temperature as noted above, thereby increasing the reaction rate of the polyurethane material by raising the temperature.

The sequence of operation in this embodiment is described below.

Figure 4:
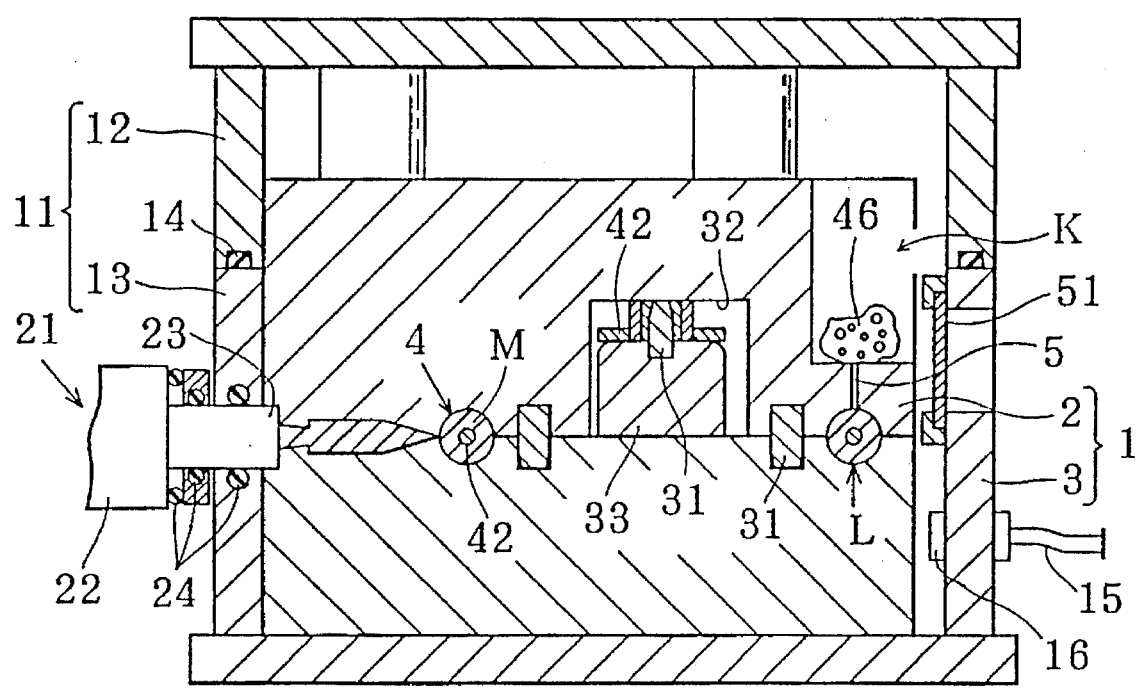
FIG. 4 is a sectional view showing the mold and the vacuum chamber as closed for RIM.

First, with the mold (1) open as shown in FIG. 1, the core (42) is set in the movable half (3) as shown in FIG. 2. The mold (1) is closed to form the cavity (4), and almost simultaneously, the vacuum chamber (11) is closed airtight, as shown in FIG. 4. According to this embodiment, the lower casing (13) is raised by a hydraulic cylinder ram (not shown) until the sealing (14) comes into contact with the upper casing (12), so as to close the vacuum chamber (11) airtight, and simultaneously the stationary half (2) and the movable half (3) are closed. Incidentally, it is possible to close and open the mold (1) and the vacuum chamber (11) independently using separate hydraulic cylinders, so that it is also possible to close and open the mold (1) and the vacuum chamber (11) simultaneously or separately.

Then, the vacuum pump (20) is put in operation so as to evacuate the space K in the vacuum chamber (11) to a prescribed vacuum degree, which is usually 500 Torr or below, through the suction port (16). The space K should preferably be evacuated to 100 Torr or below in order to make an integral skin thicker, and more preferably to 50 Torr or below. During this step, the cavity (4) is in communication with the space K in the vacuum chamber (11) through the sprue (6), the clearance between the PL surfaces (2a) and (3a), and the vent hole (5). Therefore, the cavity (4) is also evacuated to almost the same prescribed vacuum degree as in the space K. With the evacuation continued, the polyurethane material M is injected for RIM into the cavity (4) of the closed mold (1) through the injection nozzle (23) of the mixing head (22), as shown in FIG. 4. The volume of injection is usually ¼ to ¾ of the volume of the cavity (4). The injection time is 2–4 seconds. The space K, which is communicating with the cavity (4) through the clearance between the PL surfaces (2a) and (3a), functions as an accumulator. Therefore, the space K prevents the pressure in the cavity (4) from increasing as the polyurethane material M foams.

Figure 8:
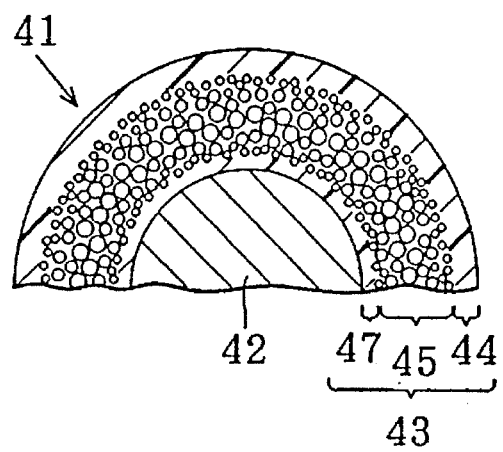
FIG. 8 is a partly enlarged sectional view of the ISF cover as shown in FIG. 7.
Figure 9:
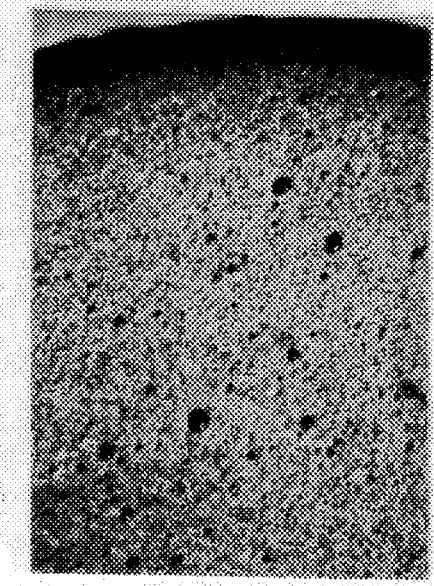
FIG. 9 is a photograph of 8.3 magnifications showing an enlarged section of an ISF cover according to Example 1 as molded from a polyurethane material containing n-pentane (the amount of n-pentane to be added: 2 parts by weight)
Figure 10:
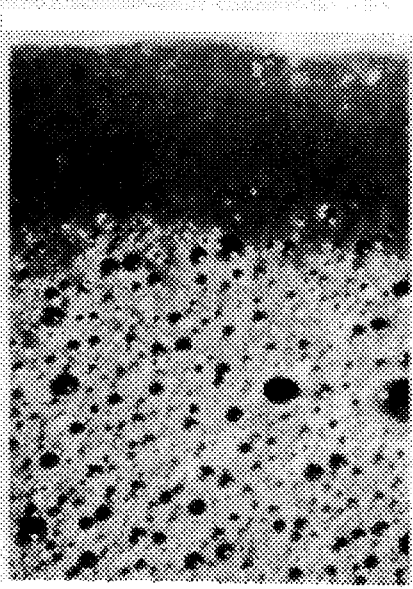
FIG. 10 is a photograph of 33 magnifications showing the enlarged section of the ISF cover according to Example 1 (the amount of n-pentane to be added: 2 parts by weight)
Figure 11:
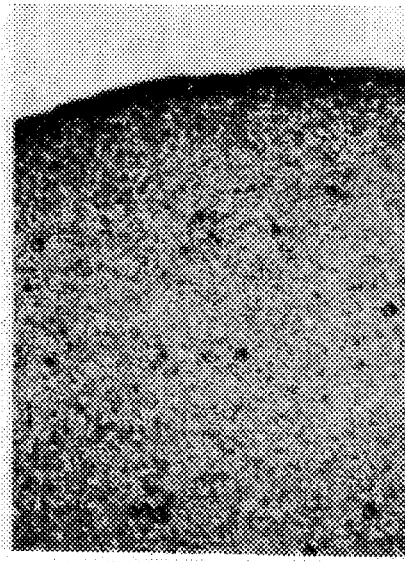
FIG. 11 is a photograph of 8.3 magnifications showing an enlarged section of an ISF cover according to Example 2 as molded from a polyurethane material containing 1.5 parts by weight of methylene chloride.
Figure 12:
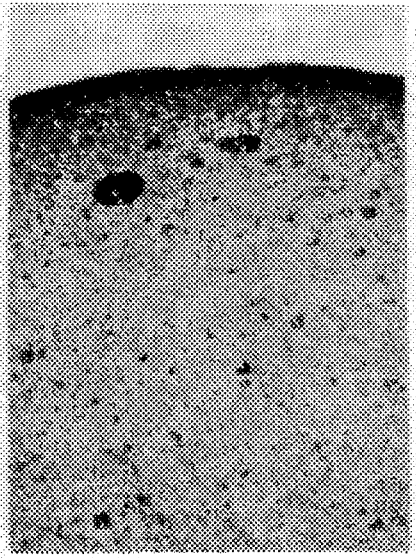
FIG. 12 is a photograph of 8.3 magnifications showing an enlarged section of an ISF cover according to Example 2 as molded from a polyurethane material containing 3 parts by weight of methylene chloride.
Figure 13:
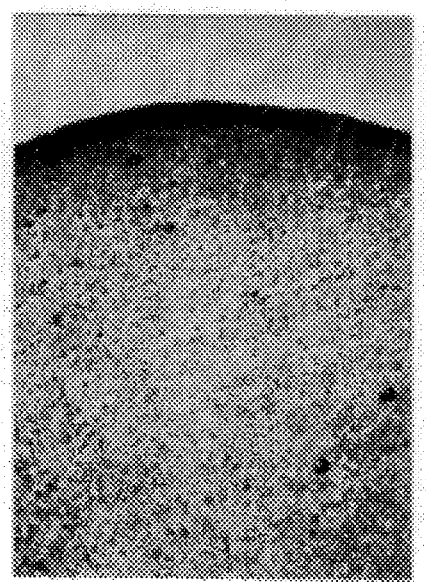
FIG. 13 is a photograph of 8.3 magnifications showing an enlarged section of an ISF cover according to Example 2 as molded from a polyurethane material containing 5 parts by weight of methylene chloride.
Figure 14:
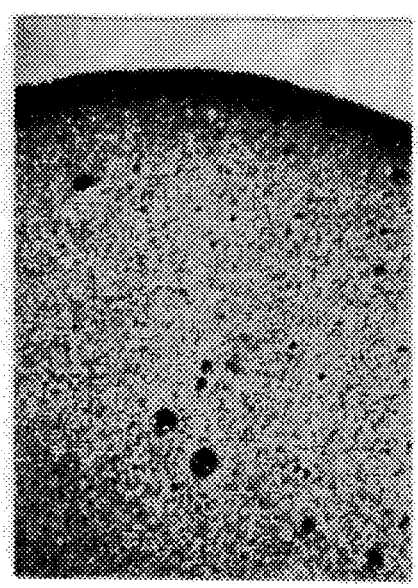
FIG. 14 is a photograph of 8.3 magnifications showing an enlarged section of an ISF cover according to Example 3 as molded from a polyurethane material containing 2 parts by weight of methyl ethyl ketone.
Figure 15:
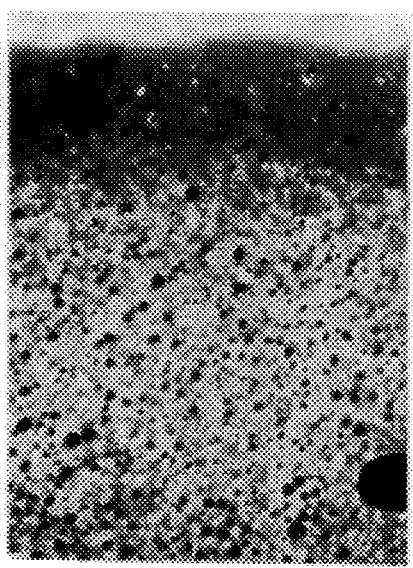
FIG. 15 is a photograph of 33 magnifications showing the enlarged section of the ISF cover according to Example 3 (the amount of methyl ethyl ketone to be added: 2 parts by weight)
Figure 16:
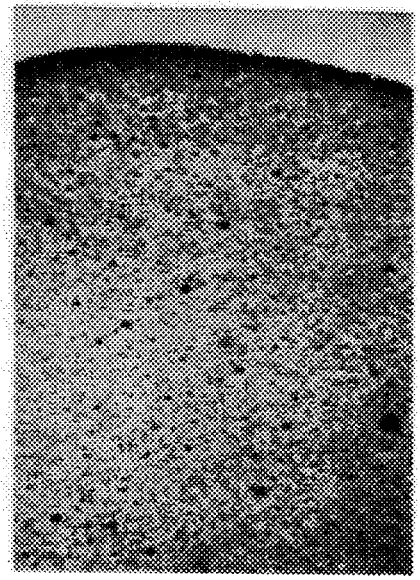
FIG. 16 is a photograph of 8.3 magnifications showing an enlarged section of an ISF cover according to Example 4 as molded from a polyurethane material containing 2 parts by weight of n-butyl acetate.
Figure 17:
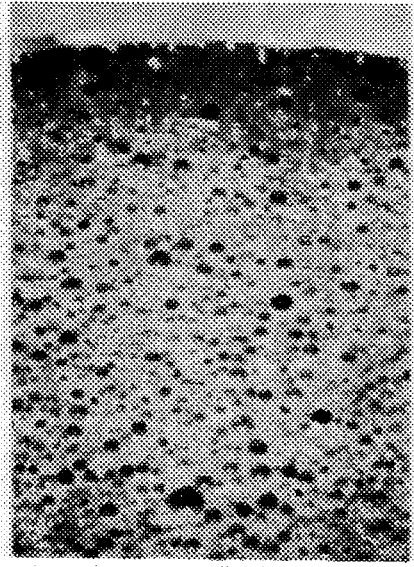
FIG. 17 is a photograph of 33 magnifications showing the enlarged section of the ISF cover according to Example 4 (the amount of n-butyl acetate to be added: 3 parts by weight)
Figure 18:
FIG. 18 is a photograph of 8.3 magnifications showing an enlarged section of an ISF cover according to Example 5 as molded from a polyurethane material containing 0.5 parts by weight of IPA (isopropyl alcohol; the amount of IPA to be added: 0.4 parts by weight)
Figure 19:
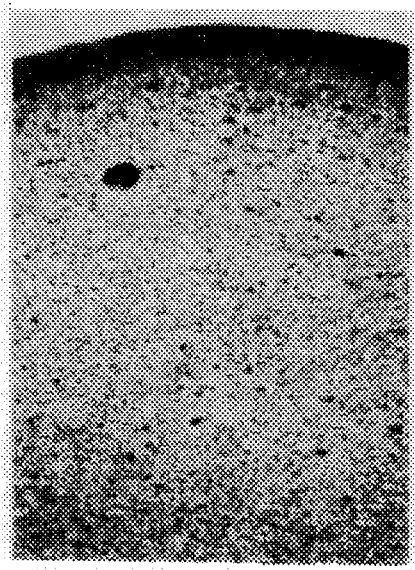
FIG. 19 is a photograph of 8.3 magnifications showing an enlarged section of an ISF cover according to Example 5 as molded from a polyurethane material containing 1.0 parts by weight of IPA.
Figure 20:
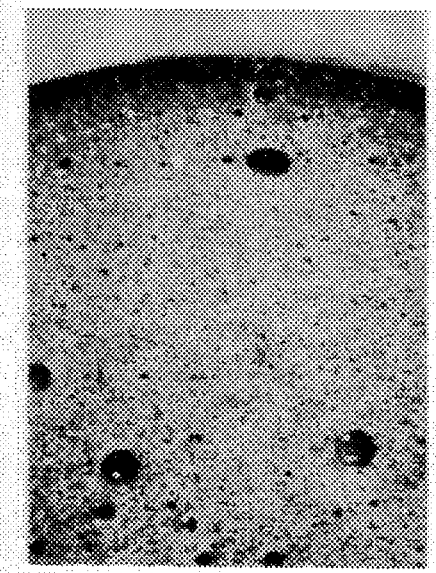
FIG. 20 is a photograph of 8.3 magnifications showing an enlarged section of an ISF cover according to Example 5 as molded from a polyurethane material containing 1.5 parts by weight of IPA.
Figure 21:
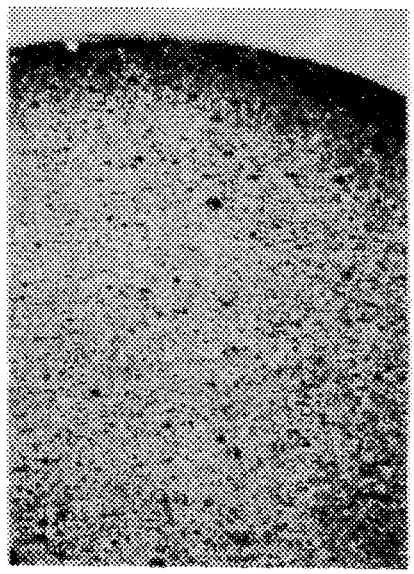
FIG. 21 is a photograph of 8.3 magnifications showing an enlarged section of an ISF cover according to Example 6 as molded from a polyurethane material containing 0.5 parts by weight of 2-butanol.
Figure 22:
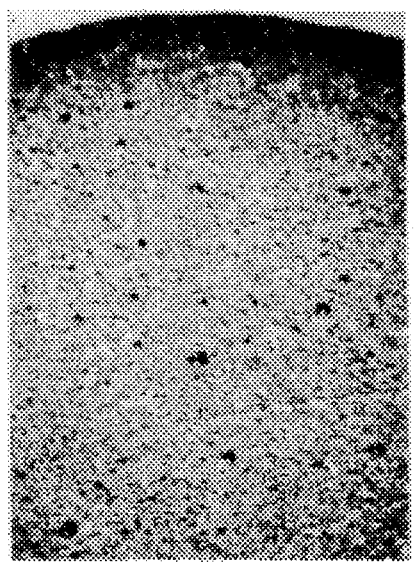
FIG. 22 is a photograph of 8.3 magnifications showing an enlarged section of an ISF cover according to Example 6 as molded from a polyurethane material containing 1.0 parts by weight of 2-butanol.
Figure 23:
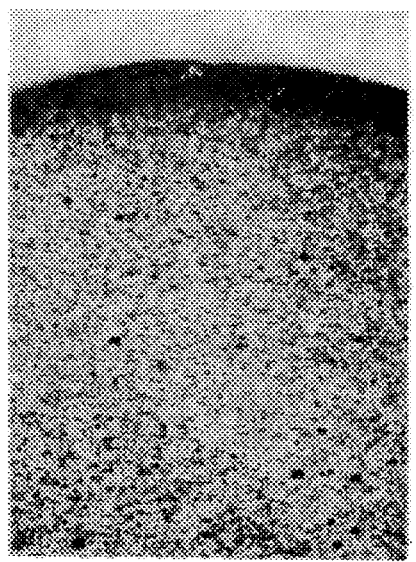
FIG. 23 is a photograph of 8.3 magnifications showing an enlarged section of an ISF cover according to Example 6 as molded from a polyurethane material containing 1.5 parts by weight of 2-butanol.
Figure 24:
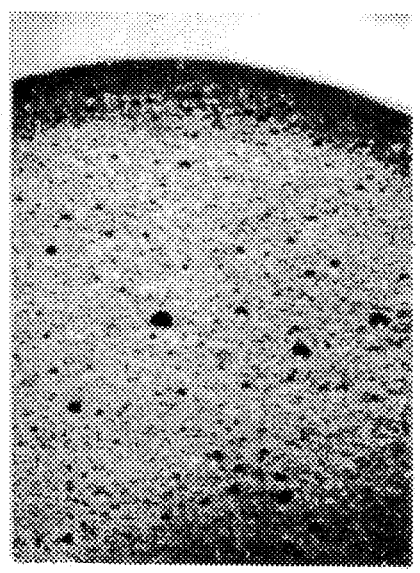
FIG. 24 is a photograph of 8.3 magnifications showing an enlarged section of an ISF cover according to Example 7 as molded from a polyurethane material containing IPA and 2-butanol (the amount of IPA was 1.5 parts by weight; and the amount of 2-butanol to be added was 0.5 parts by weight)
Figure 25:
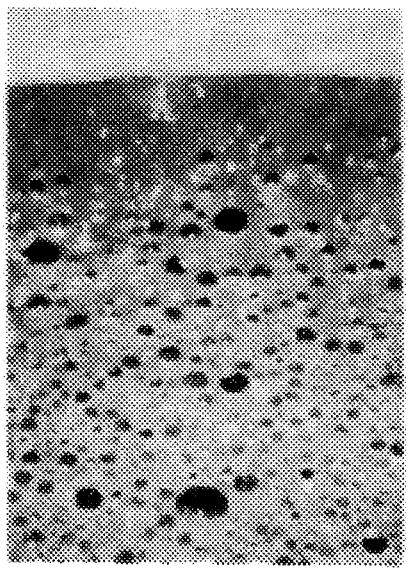
FIG. 25 is a photograph of 33 magnifications showing the enlarged section of the ISF cover according to Example 7 (the amount of IPA was 1.5 parts by weight; and the amount of 2-butanol to be added was 0.5 parts by weight)
Figure 26:
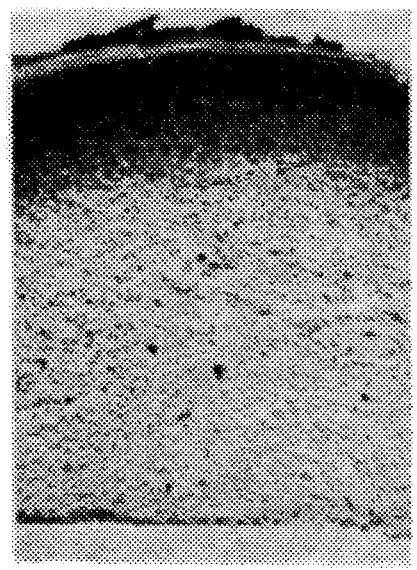
FIG. 26 is a photograph of 8.3 magnifications showing an enlarged section of an ISF cover according to a comparative example as molded from a polyurethane material containing freon.
Figure 27:
FIG. 27 is a photograph of 33 magnifications showing the enlarged section of the ISF cover according to the comparative example.

At the center, which is away from the wall surface of the cavity and the core (42), the injected polyurethane material M forms a highly foamed core (45) (as shown in FIG. 8) owing to the above-mentioned foaming, under reduced pressure, by the gases absorbed in the material. The polyurethane material M close to the wall surface of the cavity forms a solid integral skin (44) having a low degree of foaming such that virtually no bubbles remain (as shown in FIG. 8) by the above-mentioned debubbling of the absorbed gases. The polyurethane material M close to the surface of the core (42) also forms a solid adhesive layer (47) having a low degree of foaming (as shown in FIG. 8) by the debubbling mentioned above. Usually, the adhesive layer (47) is slightly thinner than the skin (44). Further, the solvent brings about the restricted initial increase in viscosity of the polyurethane material and thereby a rise in its fluidity. Then, the bubbling and debubbling of the absorbed gases can be caused uniformly to form the integral skin (44), core (45) and adhesive layer (47) which are free from any defect.

The injected polyurethane material M usually takes 1–2 seconds to fill the cavity. As the polyurethane material M flows in the cavity, it seals the clearance between the PL surfaces (2a) and (3a). The reaction rate of the polyurethane material M is controlled such that as soon as the forward end of the flowing polyurethane material M reaches the final filling position L and slightly blows off from the vent hole (5), it cures to seal the vent hole (5). In addition, the foaming by the absorbed gases takes place without taking away the reaction heat, and the solvent added to the material only restricts its initial increase in viscosity, with the result that the temperature of the polyurethane material M rises further. This results in a reduced cure time in comparison with the freon-based foaming.

According to this embodiment, one can observe what is happening in the vicinity of the vent hole (5) through the sight glass (51) from the outside of the vacuum chamber (11), as shown in FIG. 5. That is, one can see the polyurethane material M blowing off from the vent hole (5) or foaming, while keeping the vacuum chamber (11) closed.

An additional effect of evacuating the cavity (4) is that the polyurethane material M completely fills undercuts and branches in the cavity (4). Further, gases absorbed in the polyurethane material are debubbled to be discharged through the vent hole (5) and the clearance between the PL surfaces (2a) and (3a). This eliminates the necessity of overpacking the polyurethane material, unlike the conventional freon-based foaming, and thereby reduces the loss of the material.

Figure 7:
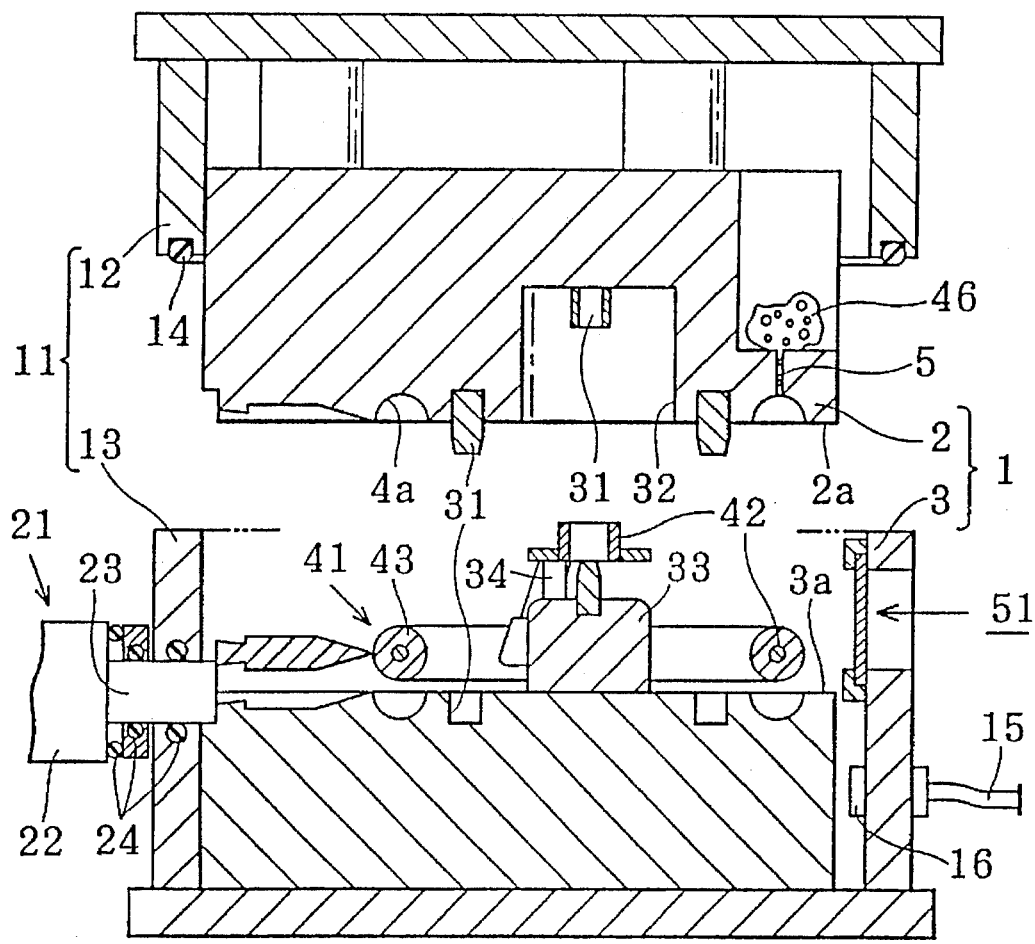
FIG. 7 is a sectional view of the mold and the vacuum chamber as opened, and an ISF cover as released from the mold.

When the polyurethane material M has cured in the cavity, the mold (1) is opened and simultaneously the vacuum chamber (11) is opened, as shown in FIG. 7. The cure time is usually 50–80 seconds. (The freon-containing polyurethane material takes 80–100 seconds to cure.) The mold opening action is interlocked with the ejector pin (34) which automatically releases the finished steering wheel (41) having the ISF cover (43).

According to the process and material of this embodiment, the following effects, which are particularly suitable for molding the ISF cover (43) for the steering wheel (41), can be obtained. The polyurethane material M is subject to turbulence owing to the long ring of the core (42), and turbulence normally causes defects such as pinholes, voids and short shot. In this embodiment, however, the polyurethane material M is less liable to turbulence because the cavity (4) is evacuated. This permits one to select the position of the gate (8) more freely. In this embodiment, the gate (8) is on the outer periphery of the ring and there is only one vent hole (5). The injected polyurethane material M normally flows in two directions and the two flows meet at the final fill position L, as described above. The flow in this manner used to cause a weld line at the meeting point and to entrap gases which lead to defects such as pinholes, voids and short shot. In this embodiment, however, this problem is solved because the cavity is evacuated and the polyurethane material at the meeting point blows off from the vent hole (5).

In this embodiment, the ISF cover (43) firmly adheres to the ring of the core (42), because the solid adhesive layer (47) containing very few minute bubbles is formed on the surface of the core (42). Further, the ISF cover (43) molded according to this embodiment contained no bubbles on the surface of the integral skin (44), so that a surface appearance and feel are superior to those of a product made by using freon. No defects, such as uneven cells or defective cavities, were found.

Particularly, the material containing a monohydric alcohol can make an ISF cover (43) having a higher degree of elongation, while not having any substantially lower tensile strength, than what can be obtained from any material containing no such alcohol.

For ascertaining the advantages of this embodiment, polyurethane materials of different compositions were prepared as shown in the following Tables 1 and 2, and each polyurethane material was injected into the cavity (4) having a vacuum degree as indicated in Table 1 or 2 to mold an ISF cover (43) for a steering wheel. The polyurethane material contained n-pentane as the solvent in Example 1; methylene chloride in Example 2; methyl ethyl ketone in Example 3; n-butyl acetate in Example 4; isopropyl alcohol (IPA) as a monohydric alcohol in Example 5; 2-butanol in Example 6; IPA and 2-butanol in Example 7; and freon in the Comparative Example. The polyether polyol as shown in Tables 1 and 2 was a mixture of equal amounts of a bifunctional polyether polyol having a molecular weight of 4000 and a trifunctional polyether polyol having a molecular weight of 6000.

TABLE 1

Composition of polyurethane material and vacuum degree of cavity

| | Components | Example 1 (parts by weight) | Example 2 (parts by weight) | Example 3 (parts by weight) | Example 4 (parts by weight) | Comparative Example (parts by weight) |
|---|---|---|---|---|---|---|
| Polyol mixture | Polyether polyol (ave. M.W. = 5000) | 100 | 100 | 100 | 100 | 100 |
| | Diethylene glycol (M.W. = 106) | 18 | 18 | 18 | 18 | 18 |
| | Triethylenediamine | 0.5 | 0.5 | 0.5 | 0.5 | 0.7 |
| | Pigment | 6 | 6 | 6 | 6 | 6 |
| | Antioxidant | 1 | 1 | 1 | 1 | 1 |
| | Silicone (foam stabilizer) | 1 | 1 | 1 | 1 | — |
| | N-pentane | 2 | — | — | — | — |
| | Methylene chloride | — | 1.5–5.0 | — | — | — |
| | Methyl ethyl ketone | — | — | 2 | — | — |
| | N-butyl acetate | — | — | — | 3 | — |
| | HCFC-123 | — | — | — | — | 16 |
| Isocyanate | MDI prepolymer (NCO 28%) | 65 | 65 | 65 | 65 | 65 |
| Vacuum degree of cavity (Torr) | | 10–500 | 30 | 10 | 10 | atmospheric pressure |

TABLE 2

Composition of polyurethane material and vacuum degree of cavity

| | Components | Example 5 (parts by weight) | Example 6 (parts by weight) | Example 7 (parts by weight) | Comparative Example (parts by weight) |
|---|---|---|---|---|---|
| Polyol mixture | Polyether glycol (ave. M.W. = 5000) | 100 | 100 | 100 | 100 |
| | Diethylene Glycol (M.W. = 106) | 18 | 18 | 18 | 18 |
| | Triethylenediamine | 0.5 | 0.5 | 0.5 | 0.7 |
| | Pigment | 6 | 6 | 6 | 6 |
| | Antioxidant | 1 | 1 | 1 | 1 |
| | Silicone (foam stabilizer) | 1 | 1 | 1 | — |
| | IPA | 0.5–5.0 | — | 0.9 or 1.5 | — |
| | 2-butanol | — | 0.5–3.0 | 0.3 or 0.5 | — |
| | HCFC-123 | — | — | — | 16 |
| Isocyanate | MDI prepolymer (NCO 28%) | 65 | 65 | 65 | 65 |
| Vacuum degree of cavity (Torr) | | 20 | 30 | 10 | atmospheric pressure |

Each ISF cover (43), as molded, was examined in cross-section through a microscope. Virtually no bubble was found in the integral skin (44) of the cover according to any of Examples 1 to 7, as is obvious from FIGS. 9 to 25, but a multiplicity of fine bubbles and a number of large bubbles as well were found in the integral skin of the cover according to the Comparative Example, as is obvious from FIGS. 26 and 27. No defects, such as uneven cells or defective cavities, were found, either, in any of the products of Examples 1 to 7.

Figure 28:
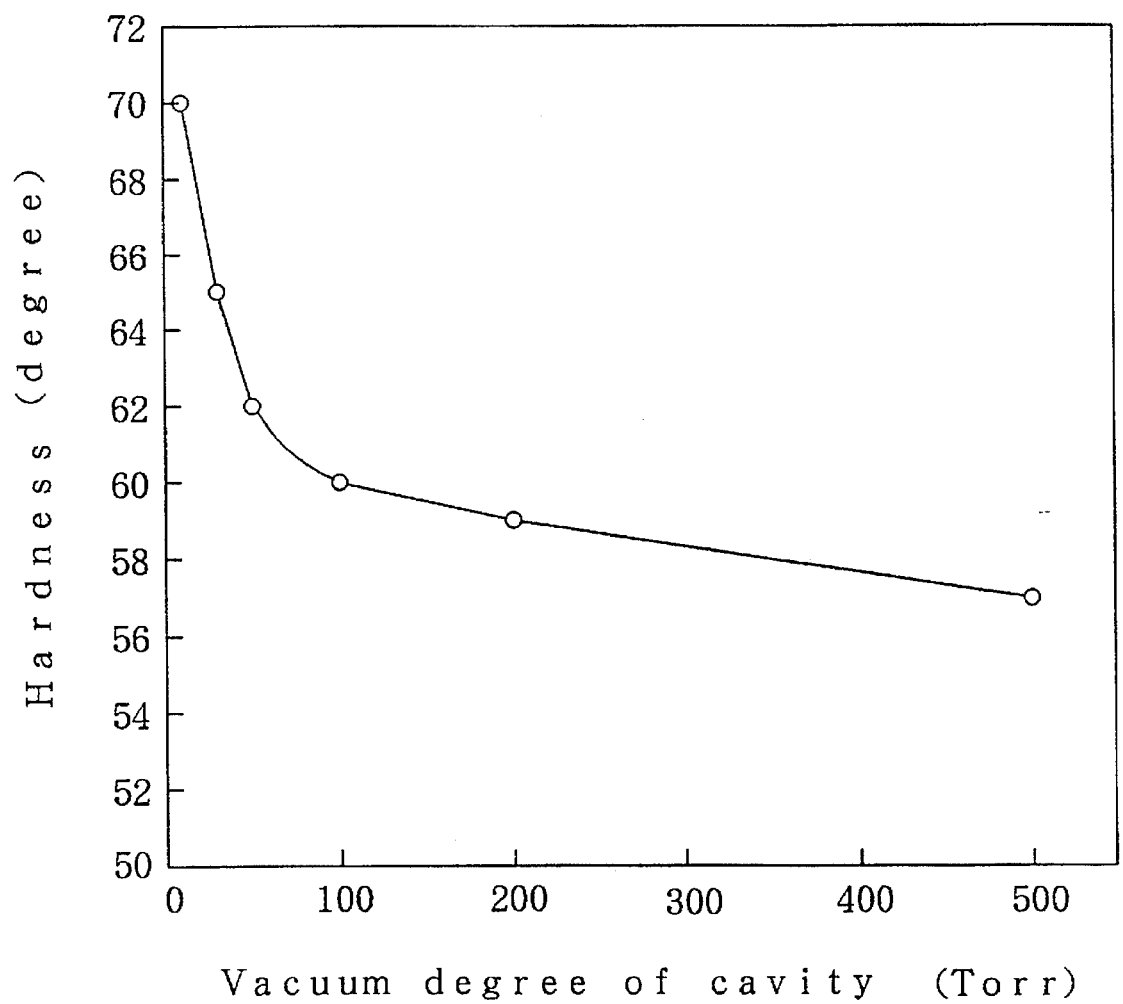
FIG. 28 is a graph showing the hardness of the integral skin of the ISF cover according to Example 1 in relation to the vacuum degree of the mold cavity.

In Example 1, different vacuum degrees of 10, 30, 50, 100, 200 and 500 Torr were employed for the cavity (4), and the integral skin (44) of each ISF cover (43), as molded, was examined for hardness at room temperature. The results are shown in FIG. 28. As is obvious therefrom, the integral skin (44) had a greater thickness and thereby a higher hardness with a lowering in the pressure of the cavity (4).

Figure 29:
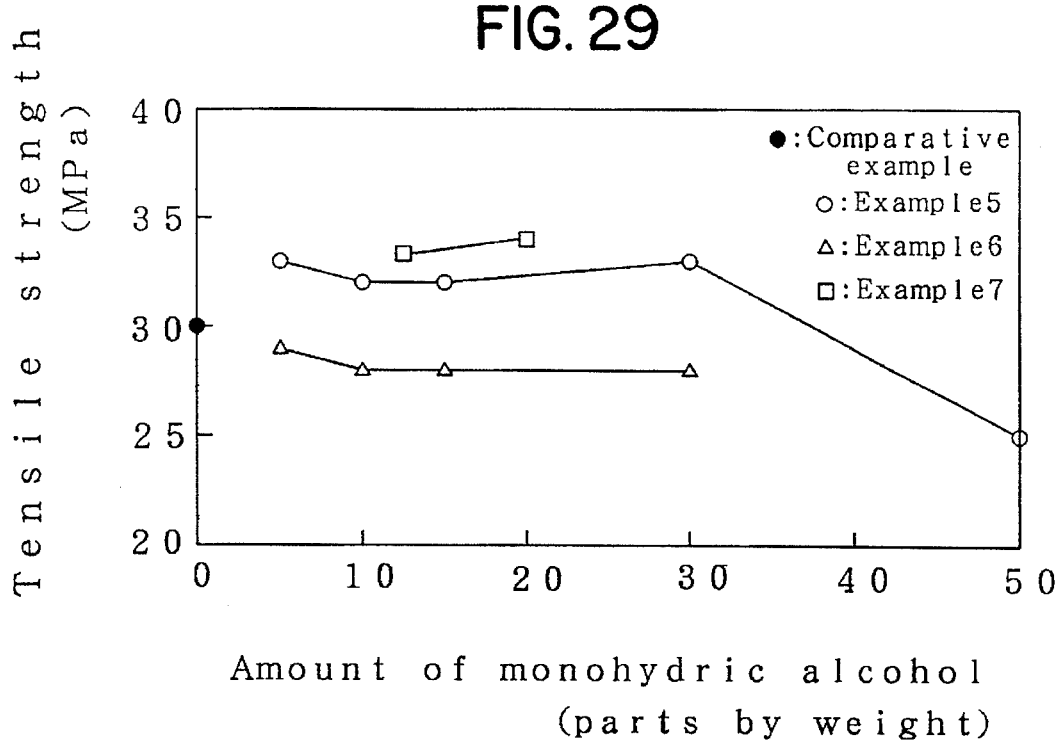
FIG. 29 is a graph showing the tensile strength of the core of the ISF cover according to each of Examples 5 to 7 in relation to the amount of the monohydric alcohol or alcohols added to the polyurethane material.
Figure 30:
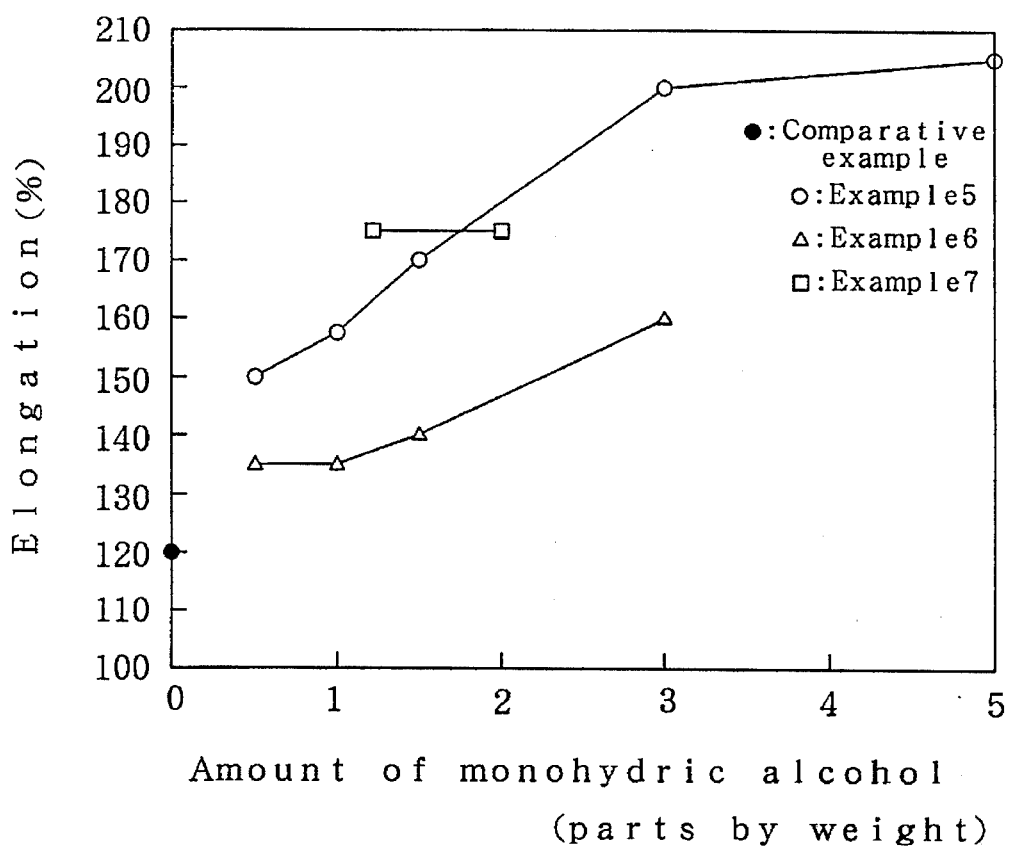
FIG. 30 is a graph showing the elongation of the core of the ISF cover according to each of Examples 5 to 7 in relation to the amount of the monohydric alcohol or alcohols added to the polyurethane material.
Figure 31:
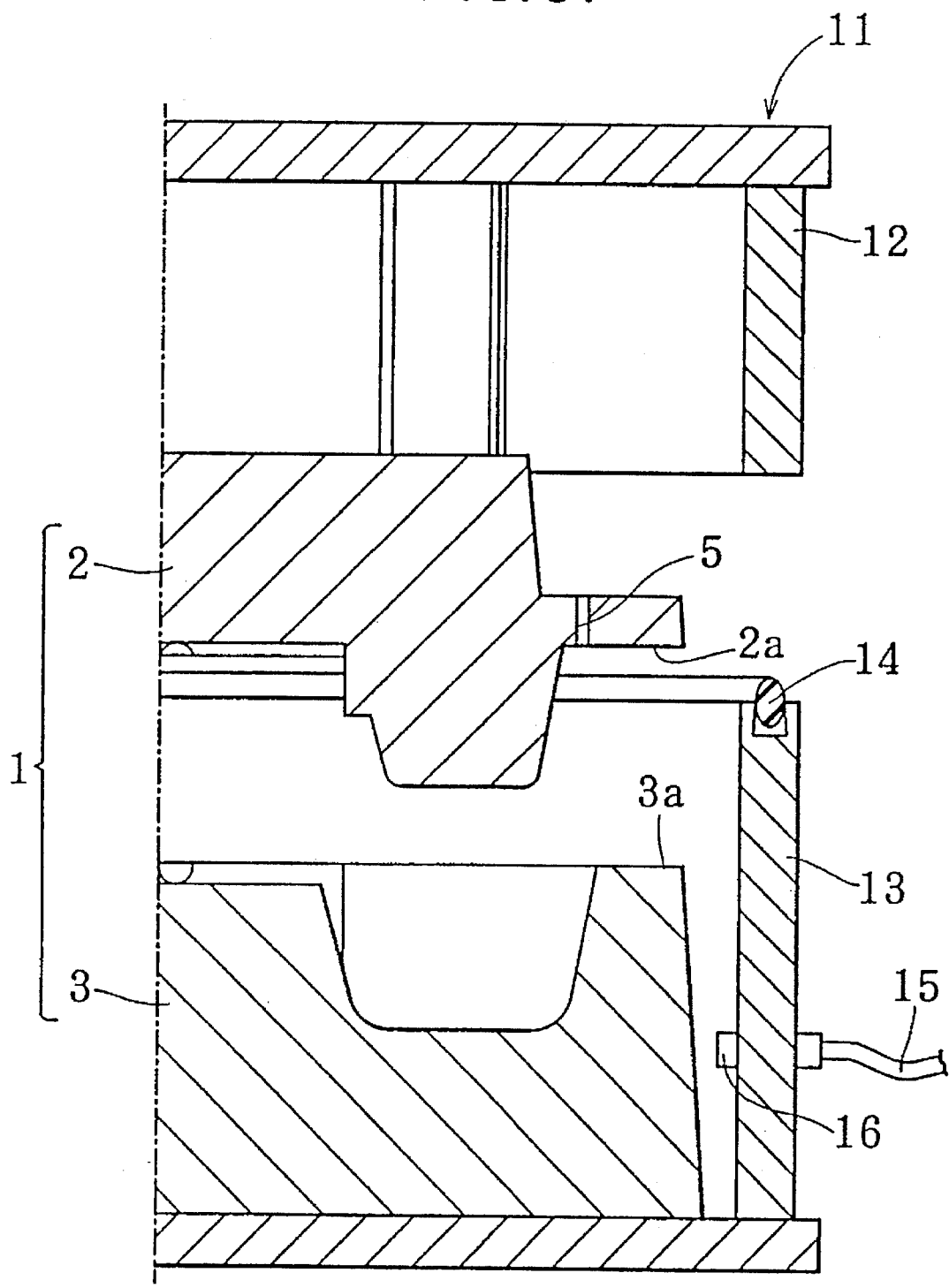
FIG. 31 is a sectional view showing a mold and vacuum chamber tin their open positions) used for RIM of an ISF pad for a steering wheel in accordance with the present invention.
Figure 32:
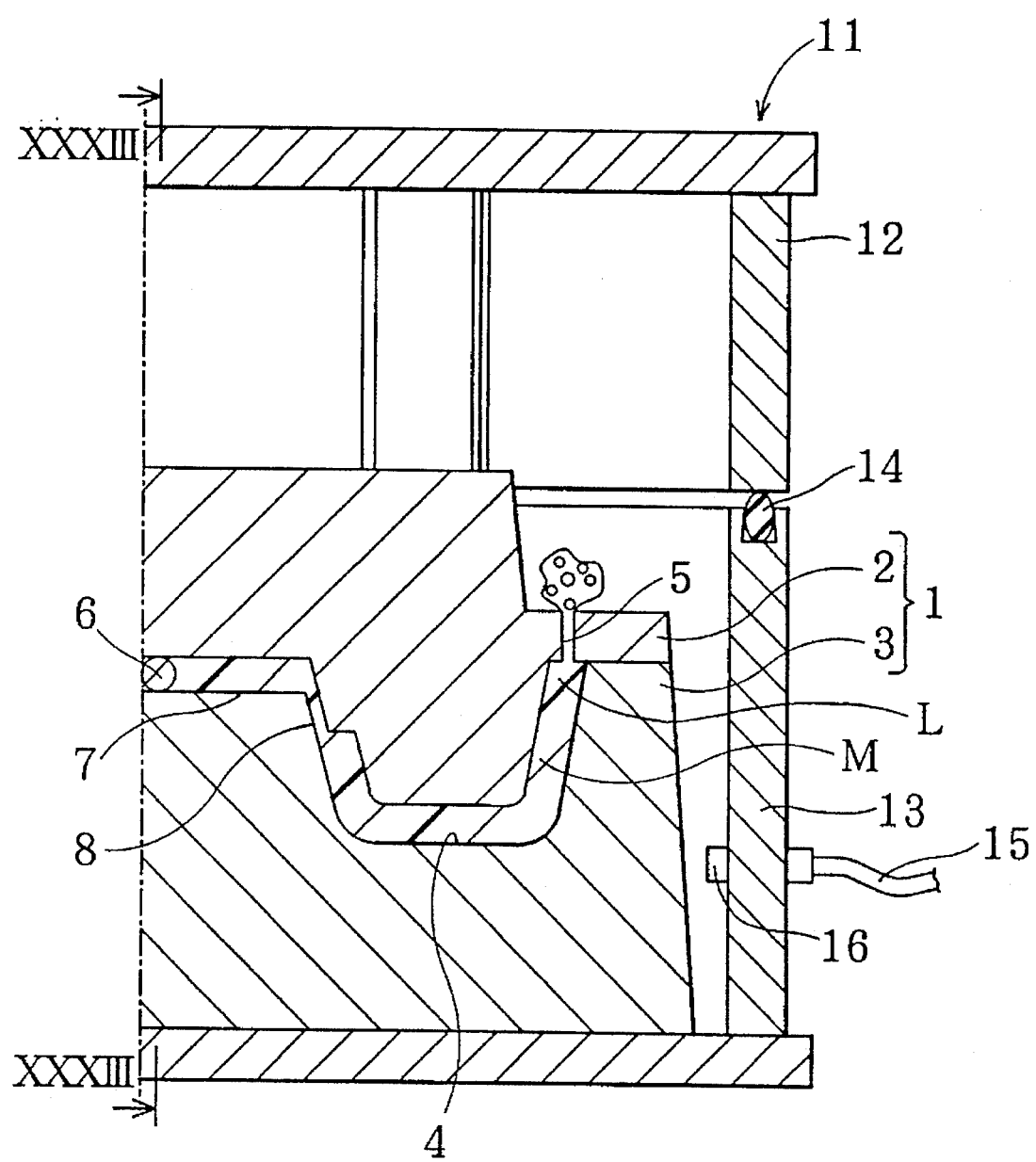
FIG. 32 is a sectional view showing the mold and the vacuum chamber as closed for RIM.
Figure 33:
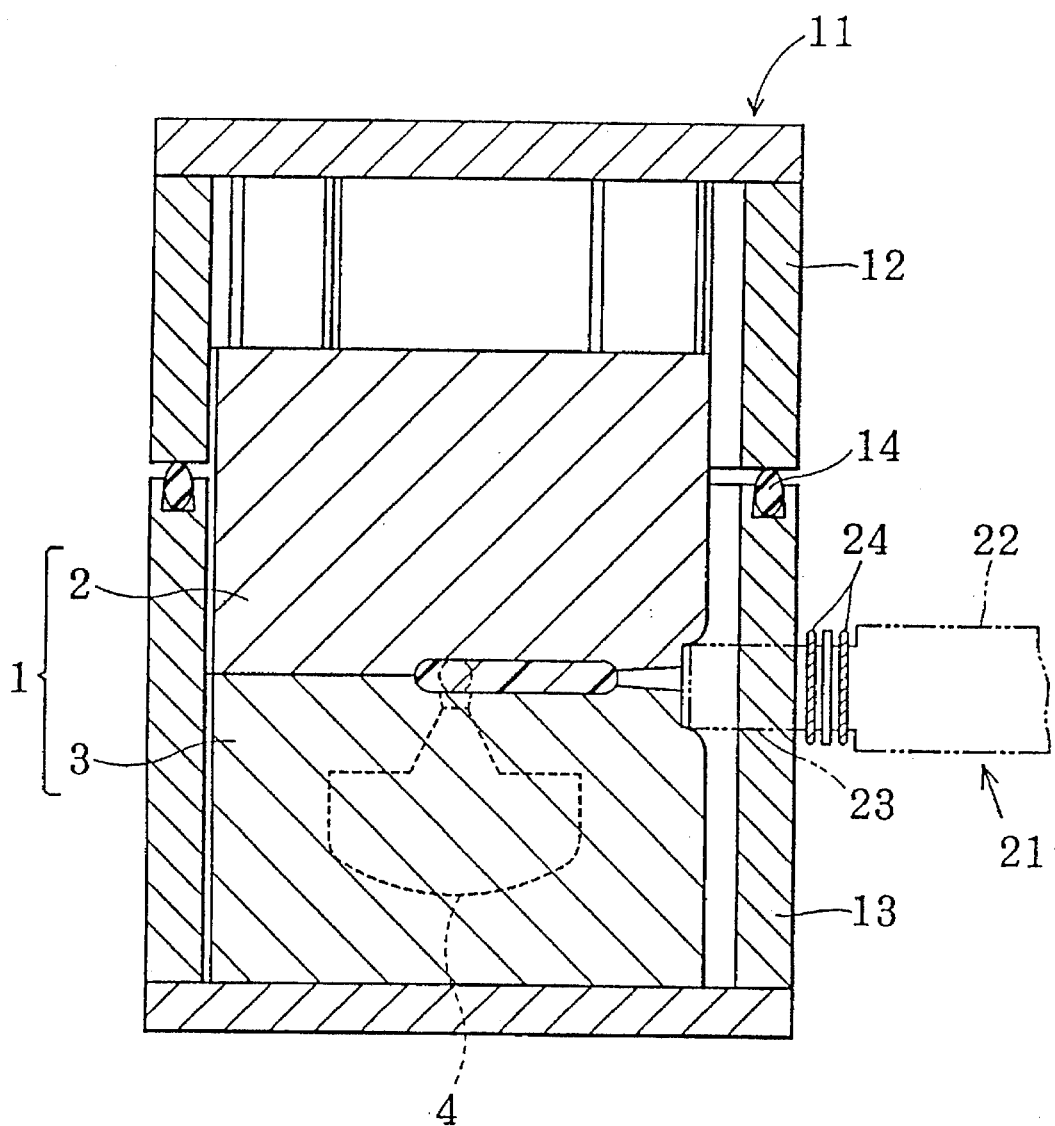
FIG. 33 is a sectional view taken along line XXXIII—XXXIII of FIG. 32.

In Examples 5 to 7 and the Comparative Example, the highly foamed core 45 was cut out of the ISF cover (43), as molded, and examined for tensile strength and elongation at room temperature. The results are shown in FIGS. 29 and 30, respectively. All of the cores in the products of Examples 5 to 7 showed a higher level of elongation without having any substantially lower tensile strength (but rather showing a higher level of tensile strength in a few cases), than the core of the product of the Comparative Example.

Reference is now made to FIGS. 31 to 34 showing a second embodiment of the present invention which is employed for molding an ISF pad for a steering wheel. The molding apparatus which is employed for carrying out this embodiment differs from the apparatus employed for the first embodiment in that a cavity (4) for molding an ISF pad is defined between a recess in the movable half (3) and a projection on the stationary half (2), and that the lower casing (13) is provided with a sealing (14) adapted to contact its upper portion. In any other respect, the two apparatuses are substantially identical in construction, and like numerals are, therefore, used to indicate like parts throughout all of the drawings showing the two apparatuses, so that no repeated description is provided.

Figure 34:
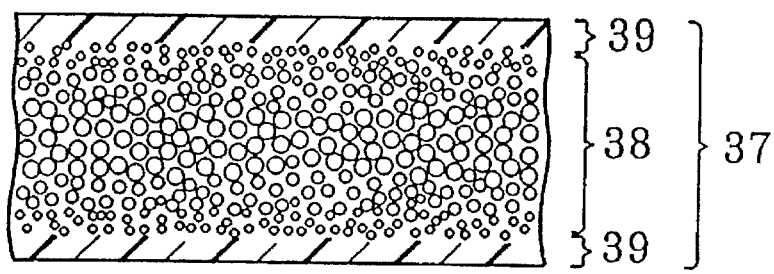
FIG. 34 is a partly enlarged sectional view of an ISF pad as molded.

A polyurethane material M, as in the first embodiment, consists essentially of a polyol component and an isocyanate component, yet substantially free of freon, preferentially, free of freon, and contains not more than 5 parts by weight of a solvent (the type not reacting with the isocyanate component, or a monohydric alcohol) for 100 parts by weight of the polyol component. The polyurethane material M is injected for RIM into the cavity (4) evacuated to a prescribed vacuum degree. At the center which is away from the wall surface of the cavity, the injected polyurethane material M forms a highly foamed core (38) (as shown in FIG. 34), while the polyurethane material M close to the wall surface forms a solid integral skin (39) having a low degree of foaming such that virtually no bubble remains (as shown in FIG. 34). Thus, the ISF pad (37) as molded has a superior appearance and better physical properties.

The second embodiment provides the same advantages as the above described first embodiment.

Figure 35:
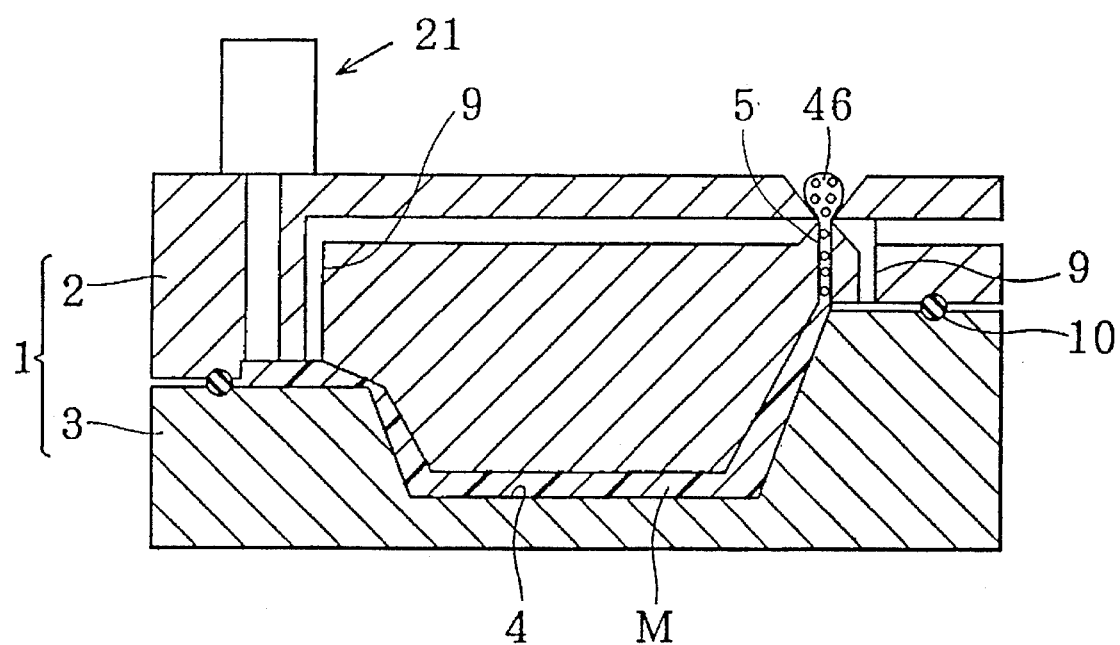
FIG. 35 is a sectional view showing another example of the mold.

It is understood that various changes and modifications may be made in the invention as, for example, those which follow without departing from the spirit and scope thereof. Although the apparatus in the first embodiment is constructed of the mold (1) and the vacuum chamber (11) which are separate from each other, the mold may be of double-wall structure, with the outer wall functioning as the vacuum chamber (11), so that the space is formed in the mold integrally with the mold. It is possible to form a groove (9) in all or part of the periphery of the cavity (4) of the mold (1), as shown in FIG. 35, so that the cavity (4) is evacuated through this groove (9). In this case, the groove (9) functions as the space. This groove (9) may be formed in either or both of the stationary half (2) and the movable half (3). It is desirable that the groove (9) be isolated from the atmosphere by a seal (10). Although the mold used in the above-mentioned embodiments has a vent hole (5), it is possible to replace the mold by one of another type having a porous core in place of the vent hole, said porous core facing the cavity and being positioned at a place where the injected polyurethane material finally reaches. The porous core permits the injected polyurethane material to be degassed before molding is completed. The mold is not limited to that of metal; but it may be replaced by a ceramic mold or resin mold which withstands the foaming pressure.

What is claimed is:

1. A process for molding a semi-rigid foam, having an integral skin comprising the steps of:

evacuating a mold cavity to reduce the pressure thereof below atmospheric pressure;

injecting into said mold cavity a polyurethane material consisting essentially of a polyol component and an isocyanate component and containing 0.5 to 5 parts by weight of a solvent for restricting initial increase in viscosity of the polyurethane material for 100 parts by weight of said polyol component, such that said polyurethane material is substantially free of freon; and expanding said material in said mold cavity such that said integral skin foam is formed due to foaming of gases absorbed in said material.

2. A process as set forth in claim 1, wherein said solvent is of the kind which is unreactive with said isocyanate component.

3. A process as set forth in claim 2, wherein said solvent is selected from the group consisting of hydrocarbons, halogenated hydrocarbons, ethers, acetals, ketones, esters, fatty acids, phenols, organic nitrogen containing compounds, organic sulfur containing compounds, organic phosphorus containing compounds and inorganic solvents.

4. A process as set forth in claim 1, wherein said solvent is a monohydric alcohol.

5. A process as set forth in claim 4, wherein said monohydric alcohol is selected from the group consisting of consisting of methanol, ethanol, n-propanol, isopropanol, n-butanol, isobutanol, secondary butanol, tertiary butanol, n-amyl alcohol, isoamyl alcohol, secondary amyl alcohol, 3-pentanol, tertiary amyl alcohol, fusel oil, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-dodecanol, trimethylnonyl alcohol, tetradecanol, heptadecanol, cyclohexanol, 2-methylcyclohexanol, benzyl alcohol, glycidol, furfuryl alcohol, tetrahydrofurfuryl alcohol, α-terpineol and abietyl alcohol.

6. A process as set forth in claim 1, wherein said mold cavity is evacuated to at least 500 Torr.

7. A polyurethane material consisting essentially of a polyol component and an isocyanate component and containing 0.5 to 5 parts by weight of a solvent for restricting initial increase in viscosity of the polyurethane material for 100 parts by weight of said polyol component, said material being substantially free of freon.

8. A material as set forth in claim 7, wherein said solvent is unreactive with said isocyanate component.

9. A material as set forth in claim 8, wherein said solvent is selected from the group consisting of hydrocarbons, halogenated hydrocarbons, ethers, acetals, ketones, esters, fatty acids, phenols, organic nitrogen containing compounds, organic sulfur containing compounds, organic phosphorus containing compounds and inorganic solvents.

10. A material as set forth in claim 7, wherein said solvent is a monohydric alcohol.

11. A material as set forth in claim 10, wherein said monohydric alcohol is selected from the group consisting of methanol, ethanol, n-propanol, isopropanol, n-butanol, isobutanol, secondary butanol, tertiary butanol, n-amyl alcohol, isoamyl alcohol, secondary amyl alcohol, 3-pentanol, tertiary amyl alcohol, fusel oil, n-hexanol, methylamyl alcohol, 2-ethylbutanol, n-heptanol, 2-heptanol, 3-heptanol, n-octanol, 2,octanol, 2-ethylhexanol, 3,5,5-trimethylhexanol, nonanol, n-decanol, undecanol, n-dodecanol, trimethylnonyl alcohol, tetradecanol, heptadecanol, cyclohexanol, 2-methylcyclohexanol, benzyl alcohol, glycidol, furfuryl alcohol, tetrahydrofurfuryl alcohol, α-terpineol and abietyl alcohol.

* * * * *